(12) United States Patent
Zhang et al.

(10) Patent No.: US 11,503,521 B2
(45) Date of Patent: Nov. 15, 2022

(54) FAILURE REPORT FOR LAYER ONE OR LAYER TWO BASED CELL HANDOVER

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 17/100,487

(22) Filed: Nov. 20, 2020

(65) Prior Publication Data

US 2021/0227436 A1     Jul. 22, 2021

Related U.S. Application Data

(60) Provisional application No. 62/962,702, filed on Jan. 17, 2020.

(51) Int. Cl.
    *H04W 36/08*       (2009.01)
    *H04W 76/19*       (2018.01)
    *H04W 74/08*       (2009.01)

(52) U.S. Cl.
    CPC ....... *H04W 36/08* (2013.01); *H04W 74/0833* (2013.01); *H04W 76/19* (2018.02)

(58) Field of Classification Search
CPC . H04W 36/08; H04W 74/0833; H04W 76/19; H04W 36/0079
USPC .................................. 455/436–444; 370/331
See application file for complete search history.

(56) References Cited

U.S. PATENT DOCUMENTS

| | | | | |
|---|---|---|---|---|
| 2011/0002273 | A1* | 1/2011 | Youn | H04W 36/0058 370/328 |
| 2012/0216039 | A1* | 8/2012 | Franklin | H04W 36/0038 713/168 |
| 2016/0029267 | A1* | 1/2016 | Huang | H04W 36/0058 455/436 |
| 2018/0167959 | A1* | 6/2018 | Liao | H04W 72/1273 |
| 2022/0104089 | A1* | 3/2022 | Chang | H04W 36/08 |

* cited by examiner

*Primary Examiner* — Michael Y Mapa
(74) *Attorney, Agent, or Firm* — Holland & Hart LLP

(57) ABSTRACT

Methods, systems, and devices for wireless communications are described. A user equipment (UE) may establish a first connection with a source base station. The UE may determine that a handover procedure is being performed for establishing a second connection with a target base station. The UE may monitor, during a monitoring period instantiated at a physical layer of a protocol stack of the UE, for a control signal acknowledging success of the handover procedure from a target base station. The UE may transmit, based at least in part on a result of the monitoring during the monitoring period, a physical layer signal or a medium access control layer signal to the source base station indicating that the handover procedure was unsuccessful based at least in part on a failure to successfully receive and decode the control signal.

30 Claims, 17 Drawing Sheets

FAILURE REPORT FOR LAYER ONE OR LAYER TWO BASED CELL HANDOVER

CROSS REFERENCE

The present Application for Patent claims the benefit of U.S. Provisional patent Application No. 62/962,702 by ZHANG et al., entitled "FAILURE REPORT FOR LAYER ONE OR LAYER TWO BASED CELL HANDOVER," filed Jan. 17, 2020, assigned to the assignee hereof, and expressly incorporated by reference herein.

BACKGROUND

The following relates generally to wireless communications, and more specifically to failure report for layer one or layer two based cell handover.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may perform a handover of a UE from a source base station to a target base station. For example, radio resource control (RRC) signaling may be used to exchange information used during a handover procedure performed between the source base station, the UE, and/or the target base station. Conventional handover techniques are deficient.

SUMMARY

The described techniques relate to improved methods, systems, devices, and apparatuses that support failure report for layer one or layer two based cell handover. Generally, the described techniques provide various mechanisms that support wireless communications in a wireless network. Broadly, aspects of the described techniques support a layer one (L1)/layer two (L2)-centric inter-cell mobility handover procedure that includes a handover failure report sent from the user equipment (UE) to its source base station. That is, the UE may be connected to the source base station via a first connection. The UE and/or source base station may determine that a handover procedure is to be performed, e.g., based on a measurement report, UE mobility, etc. The handover procedure may be for the UE to establish a new connection (e.g., a second connection) with a target base station. The UE may initiate a timer or timer function at the L1 (e.g., the physical layer) of the protocol stack of the UE during a handover procedure. Generally, the timer may be used to establish a monitoring period during which the UE monitors for a control signal acknowledging success of the handover procedure to the target base station. For example, based on the timer instantiated at L1 of the UE protocol stack, the UE may monitor for the control signal acknowledging handover success, with the control signal including a random access channel (RACH) signal received from the target base station, a resource release command received from the source base station, and the like. If the UE determines that it has not received the control signal during the monitoring period, it may transmit an L1/L2 signal (e.g., a physical layer signal and/or a medium access control (MAC) signal) to the source base station indicating that the handover procedure was unsuccessful. The UE may then wait for an acknowledgment from the source base station and, if not received, determine that the first connection with the source base station has dropped. In this situation, the UE may initiate a radio resource control (RRC) connection establishment procedure to establish a connection with the source base station, the target base station, or some other candidate base station. If the UE receives the acknowledgment from the source base station, the UE and/or source base station may continue communicating over the first connection and/or identify a new target base station with which to perform a handover.

A method of wireless communication at a UE is described. The method may include establishing a first connection with a source base station, determining that a handover procedure is being performed for establishing a second connection with a target base station, monitoring, during a monitoring period instantiated at a physical layer of a protocol stack of the UE, for a control signal acknowledging success of the handover procedure from a target base station, and transmitting, based on a result of the monitoring during the monitoring period, a physical layer signal or a MAC layer signal to the source base station indicating that the handover procedure was unsuccessful based on a failure to successfully receive and decode the control signal.

An apparatus for wireless communication at a UE is described. The apparatus may include a processor, memory coupled with the processor, and instructions stored in the memory. The instructions may be executable by the processor to cause the apparatus to establish a first connection with a source base station, determine that a handover procedure is being performed for establishing a second connection with a target base station, monitor, during a monitoring period instantiated at a physical layer of a protocol stack of the UE, for a control signal acknowledging success of the handover procedure from a target base station, and transmit, based on a result of the monitoring during the monitoring period, a physical layer signal or a MAC layer signal to the source base station indicating that the handover procedure was unsuccessful based on a failure to successfully receive and decode the control signal.

Another apparatus for wireless communication at a UE is described. The apparatus may include means for establishing a first connection with a source base station, determining that a handover procedure is being performed for establishing a second connection with a target base station, monitoring, during a monitoring period instantiated at a physical layer of a protocol stack of the UE, for a control signal acknowledging success of the handover procedure from a target base station, and transmitting, based on a result of the monitoring during the monitoring period, a physical layer signal or a MAC layer signal to the source base station indicating that the handover procedure was unsuccessful based on a failure to successfully receive and decode the control signal.

A non-transitory computer-readable medium storing code for wireless communication at a UE is described. The code may include instructions executable by a processor to establish a first connection with a source base station, determine that a handover procedure is being performed for establishing a second connection with a target base station, monitor, during a monitoring period instantiated at a physical layer of a protocol stack of the UE, for a control signal acknowledging success of the handover procedure from a target base station, and transmit, based on a result of the monitoring during the monitoring period, a physical layer signal or a MAC layer signal to the source base station indicating that the handover procedure was unsuccessful based on a failure to successfully receive and decode the control signal.

Some examples of the method, apparatuses, and non-transitory computer-readable medium described herein may further include operations, features, means, or instructions for receiving a configuration signal from the source base station identifying a duration for the monitoring period initiated during the handover procedure.

Some examples of the method, apparatuses, and non-transitory computer-readable medium described herein may further include operations, features, means, or instructions for initiating the monitoring period at the physical layer based on the handover procedure, where the physical layer signal or the MAC layer signal may be transmitted based on expiration of the monitoring period without successfully receiving and decoding the control signal.

In some examples of the method, apparatuses, and non-transitory computer-readable medium described herein, the configuration signal includes at least one of a RRC signal, or a MAC control element (CE), or a downlink control information (DCI), or a combination thereof.

In some examples of the method, apparatuses, and non-transitory computer-readable medium described herein, the monitoring period may be initiated based on at least one of receiving a handover command from the source base station, or transmitting an acknowledgement message in response to the handover command to the source base station, or transmitting a first RACH message to the target base station, or a combination thereof.

Some examples of the method, apparatuses, and non-transitory computer-readable medium described herein may further include operations, features, means, or instructions for identifying a duration for the monitoring period initiated during the handover procedure as a preconfigured duration.

Some examples of the method, apparatuses, and non-transitory computer-readable medium described herein may further include operations, features, means, or instructions for performing, during the handover procedure, a RACH procedure with the target base station, where the handover procedure being unsuccessful may be based on a failure to successfully receive and decode a RACH message from the target base station during the RACH procedure, the RACH message including the control signal.

In some examples of the method, apparatuses, and non-transitory computer-readable medium described herein, the RACH message includes at least one of a RACH message two (msg2) of a four-step RACH procedure, or a RACH message four (msg4) of the four-step RACH procedure, or a RACH message B (msgB) of a two-step RACH procedure, or a combination thereof.

Some examples of the method, apparatuses, and non-transitory computer-readable medium described herein may further include operations, features, means, or instructions for identifying, during the handover procedure, a failure to successfully receive and decode a resource release command from the target base station during the handover procedure, where the handover procedure being unsuccessful may be based on the absence of the resource release command, the resource release command including the control signal.

In some examples of the method, apparatuses, and non-transitory computer-readable medium described herein, the resource release command includes a connection reestablishment message received from the target base station.

Some examples of the method, apparatuses, and non-transitory computer-readable medium described herein may further include operations, features, means, or instructions for determining that an acknowledgement message was not received from the source base station acknowledging receipt of the physical layer signal or the MAC signal, and determining, based on the absence of the acknowledgement message, that the first connection with the source base station may have failed.

Some examples of the method, apparatuses, and non-transitory computer-readable medium described herein may further include operations, features, means, or instructions for initiating a connection reestablishment procedure to establish a new connection with the source base station, or the target base station, or a candidate target base station.

In some examples of the method, apparatuses, and non-transitory computer-readable medium described herein, the control signal includes a handover success acknowledgement signal transmitted from the target base station at the physical layer.

In some examples of the method, apparatuses, and non-transitory computer-readable medium described herein, the physical layer signal or the MAC layer signal includes at least one of a physical uplink control channel (PUCCH) signal, or a MAC CE signal, or a combination thereof.

In some examples of the method, apparatuses, and non-transitory computer-readable medium described herein, the physical layer signal or the MAC layer signal indicates a channel performance metric for at least one of the first connection with the source base station, the second connection with the target base station, a connection with a candidate target base station, or a combination thereof.

In some examples of the method, apparatuses, and non-transitory computer-readable medium described herein, the channel performance metric includes at least one of a reference signal received power (RSRP), or a reference signal received quality (RSRQ), or a signal-to-noise-to-interference ratio (SINR), or a combination thereof.

A method of wireless communications at a source base station is described. The method may include establishing a first connection with a UE, transmitting a configuration signal to the UE identifying a duration of a monitoring period initiated at a physical layer of a protocol stack of the UE during a handover procedure, initiating the handover procedure with the UE and a target base station for the UE to establish a second connection with the target base station, and receiving a physical layer signal or a MAC layer signal from the UE indicating that the handover procedure was unsuccessful based on a failure of the UE to successfully receive and decode a control signal from the target base station during the monitoring period.

An apparatus for wireless communications at a source base station is described. The apparatus may include a processor, memory coupled with the processor, and instructions stored in the memory. The instructions may be executable by the processor to cause the apparatus to establish a first connection with a UE, transmit a configuration signal to the UE identifying a duration of a monitoring period initiated at a physical layer of a protocol stack of the UE during a handover procedure, initiate the handover procedure with the UE and a target base station for the UE to establish a second connection with the target base station, and receive a physical layer signal or a MAC layer signal from the UE indicating that the handover procedure was unsuccessful based on a failure of the UE to successfully receive and decode a control signal from the target base station during the monitoring period.

Another apparatus for wireless communications at a source base station is described. The apparatus may include means for establishing a first connection with a UE, transmitting a configuration signal to the UE identifying a duration of a monitoring period initiated at a physical layer of a protocol stack of the UE during a handover procedure, initiating the handover procedure with the UE and a target base station for the UE to establish a second connection with the target base station, and receiving a physical layer signal or a MAC layer signal from the UE indicating that the handover procedure was unsuccessful based on a failure of the UE to successfully receive and decode a control signal from the target base station during the monitoring period.

A non-transitory computer-readable medium storing code for wireless communications at a source base station is described. The code may include instructions executable by a processor to establish a first connection with a UE, transmit a configuration signal to the UE identifying a duration of a monitoring period initiated at a physical layer of a protocol stack of the UE during a handover procedure, initiate the handover procedure with the UE and a target base station for the UE to establish a second connection with the target base station, and receive a physical layer signal or a MAC layer signal from the UE indicating that the handover procedure was unsuccessful based on a failure of the UE to successfully receive and decode a control signal from the target base station during the monitoring period.

Some examples of the method, apparatuses, and non-transitory computer-readable medium described herein may further include operations, features, means, or instructions for identifying the duration of the monitoring period initiated during the handover procedure as a preconfigured duration.

In some examples of the method, apparatuses, and non-transitory computer-readable medium described herein, the configuration signal includes at least one of a RRC signal, or a MAC CE, or a DCI, or a combination thereof.

Some examples of the method, apparatuses, and non-transitory computer-readable medium described herein may further include operations, features, means, or instructions for determining that a resource release command was not transmitted to the UE from the target base station during the handover procedure, where the handover procedure being unsuccessful may be based on the absence of the resource release command, the resource release command including the control signal.

In some examples of the method, apparatuses, and non-transitory computer-readable medium described herein, the resource release command includes a connection reestablishment message.

Some examples of the method, apparatuses, and non-transitory computer-readable medium described herein may further include operations, features, means, or instructions for transmitting an acknowledgment message to the UE acknowledging receipt of the physical layer signal or the MAC signal, and continuing to perform wireless communications with the UE over the first connection.

Some examples of the method, apparatuses, and non-transitory computer-readable medium described herein may further include operations, features, means, or instructions for transmitting an acknowledgment message to the UE acknowledging receipt of the physical layer signal or the MAC signal, identifying a new target base station for the UE based on the physical layer signal or the MAC signal, and initiating a second handover procedure with the UE and the new target base station for the UE to establish a third connection with the new target base station.

In some examples of the method, apparatuses, and non-transitory computer-readable medium described herein, the physical layer signal or the MAC layer signal includes at least one of a PUCCH layer signal, or a MAC CE signal, or a combination thereof.

In some examples of the method, apparatuses, and non-transitory computer-readable medium described herein, the physical layer signal or the MAC layer signal indicates a channel performance metric for at least one of the first connection with the source base station, the second connection with the target base station, a connection with a candidate target base station, or a combination thereof.

In some examples of the method, apparatuses, and non-transitory computer-readable medium described herein, the channel performance metric includes at least one of a RSRP, or a RSRQ, or a SINR, or a combination thereof.

DETAILED DESCRIPTION

Figure 1:
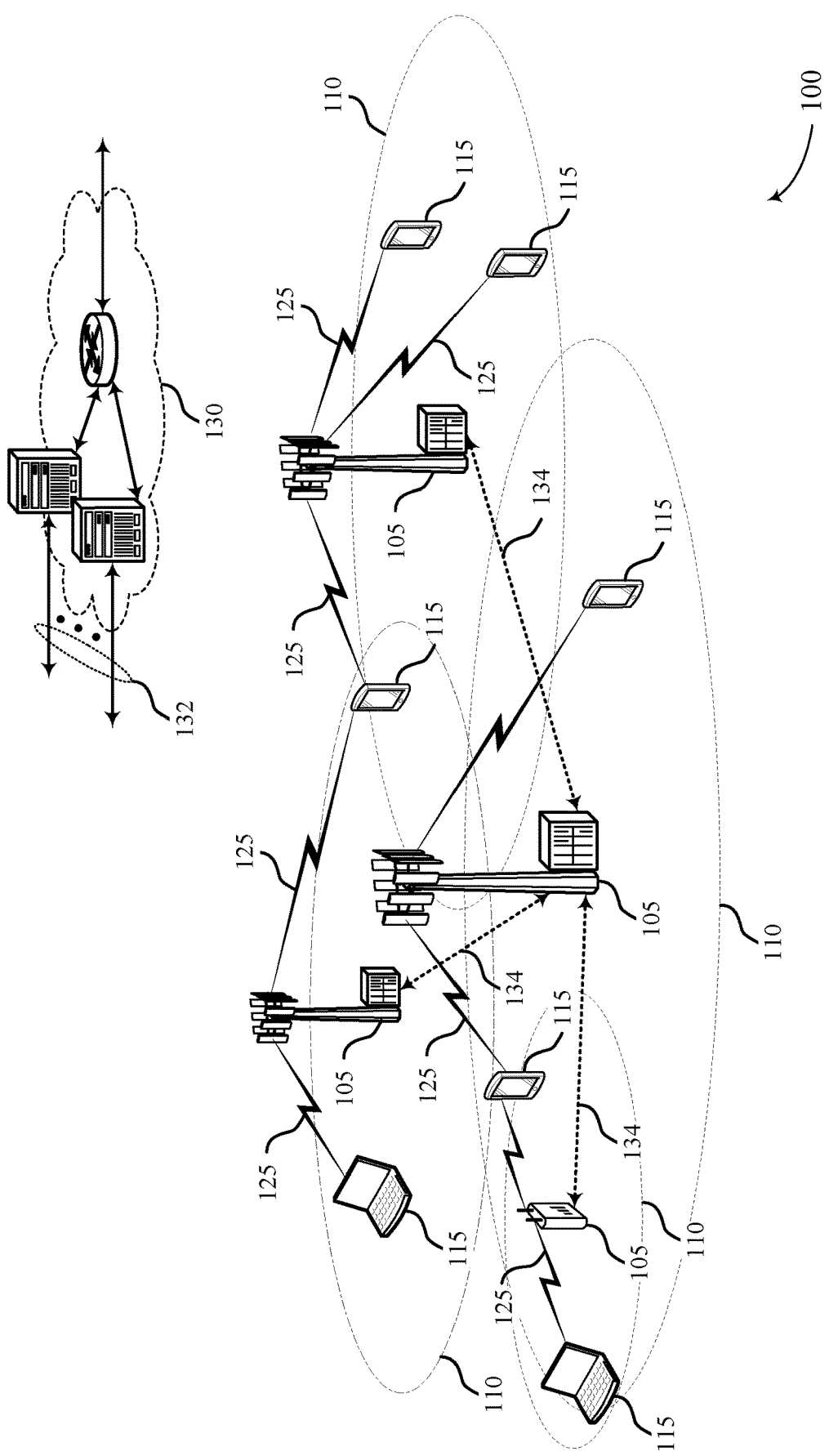
FIG. 1 illustrates an example of a system for wireless communications that supports failure report for layer one or layer two based cell handover in accordance with aspects of the present disclosure.

Wireless communication systems typically use layer three (L3) signaling to initiate and/or perform a handover of a user equipment (UE) from a source base station to a target base station. The L3 signaling may include radio resource control (RRC) signaling to exchange information used during the handover procedure between the source base station, the UE, and/or the target base station. Part of a handover procedure may include the UE performing a random access channel (RACH) procedure with the target base station to establish a new connection. However, the handover procedure may be unsuccessful in some instances, which may lead to a loss of connection with the source base station and/or the target base station. Moreover, typical handover procedures may not include any way for the UE to inform the source base station that the handover was unsuccessful. This may result in UE traffic being provided to the target base station, which may mean that the UE traffic cannot be communicated from the target base station to the UE.

Aspects of the disclosure are initially described in the context of a wireless communications system. Generally, the described techniques provide various mechanisms that support wireless communications in a wireless network. Broadly, aspects of the described techniques support a layer one (L1)/layer two (L2)-centric inter-cell mobility handover procedure that includes a handover failure report sent from the UE to its source base station. That is, the UE may be connected to the source base station via a first connection. The UE and/or source base station may determine that a handover procedure is to be performed, e.g., based on a measurement report, UE mobility, etc. The handover procedure may be for the UE to establish a new connection (e.g., a second connection) with a target base station.

The UE may initiate a timer or timer function at the L1 (e.g., the physical layer) of the protocol stack of the UE during a handover procedure. Generally, the timer may be used to establish a monitoring period during which the UE monitors for a control signal acknowledging success of the handover procedure to the target base station. For example, based on the timer instantiated at L1 of the UE protocol stack, the UE may monitor for the control signal acknowledging handover success, with the control signal including a RACH signal received from the target base station, a resource release command received from the source base station, and the like.

If the UE determines that it has not received the control signal during the monitoring period, it may transmit an L1/L2 signal (e.g., a physical layer signal and/or a medium access control (MAC) signal) to the source base station indicating that the handover procedure was unsuccessful. The UE may then wait for an acknowledgment from the source base station and, if not received, determine that the first connection with the source base station has dropped. In this situation, the UE may initiate a radio resource control (RRC) connection establishment procedure to establish a connection with the source base station, the target base station, or some other candidate base station. If the UE receives the acknowledgment from the source base station, the UE and/or source base station may continue communicating over the first connection and/or identify a new target base station to perform the handover of the UE to.

Aspects of the disclosure are further illustrated by and described with reference to apparatus diagrams, system diagrams, and flowcharts that relate to failure report for layer one or layer two based cell handover.

FIG. 1 illustrates an example of a wireless communications system 100 that supports failure report for layer one or layer two based cell handover in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may establish a first connection with a source base station 105. The UE 115 may determine that a handover procedure is being performed for establishing a second connection with a target base station 105. The UE 115 may monitor, during a monitoring period instantiated at a physical layer of a protocol stack of the UE115, for a control signal acknowledging success of the handover procedure from a target base station 105. The UE 115 may transmit, based at least in part on a result of the monitoring during the monitoring period, a physical layer signal or a MAC layer signal to the source base station 105 indicating that the handover procedure was unsuccessful based at least in part on a failure to successfully receive and decode the control signal.

A base station 105 may establishing a first connection with a UE 115. The base station 105 may transmit a configuration signal to the UE 115 identifying a duration of a monitoring period initiated at a physical layer of a protocol stack of the UE 115 during a handover procedure. The base station 105 may initiate the handover procedure with the UE 115 and a target base station 105 for the UE 115 to establish a second connection with the target base station 105. The base station 105 may receive a physical layer signal or a MAC layer signal from the UE 115 indicating that the handover procedure was unsuccessful based at least in part on a failure of the UE 115 to successfully receive and decode a control signal from the target base station 105 during the monitoring period.

Figure 2:
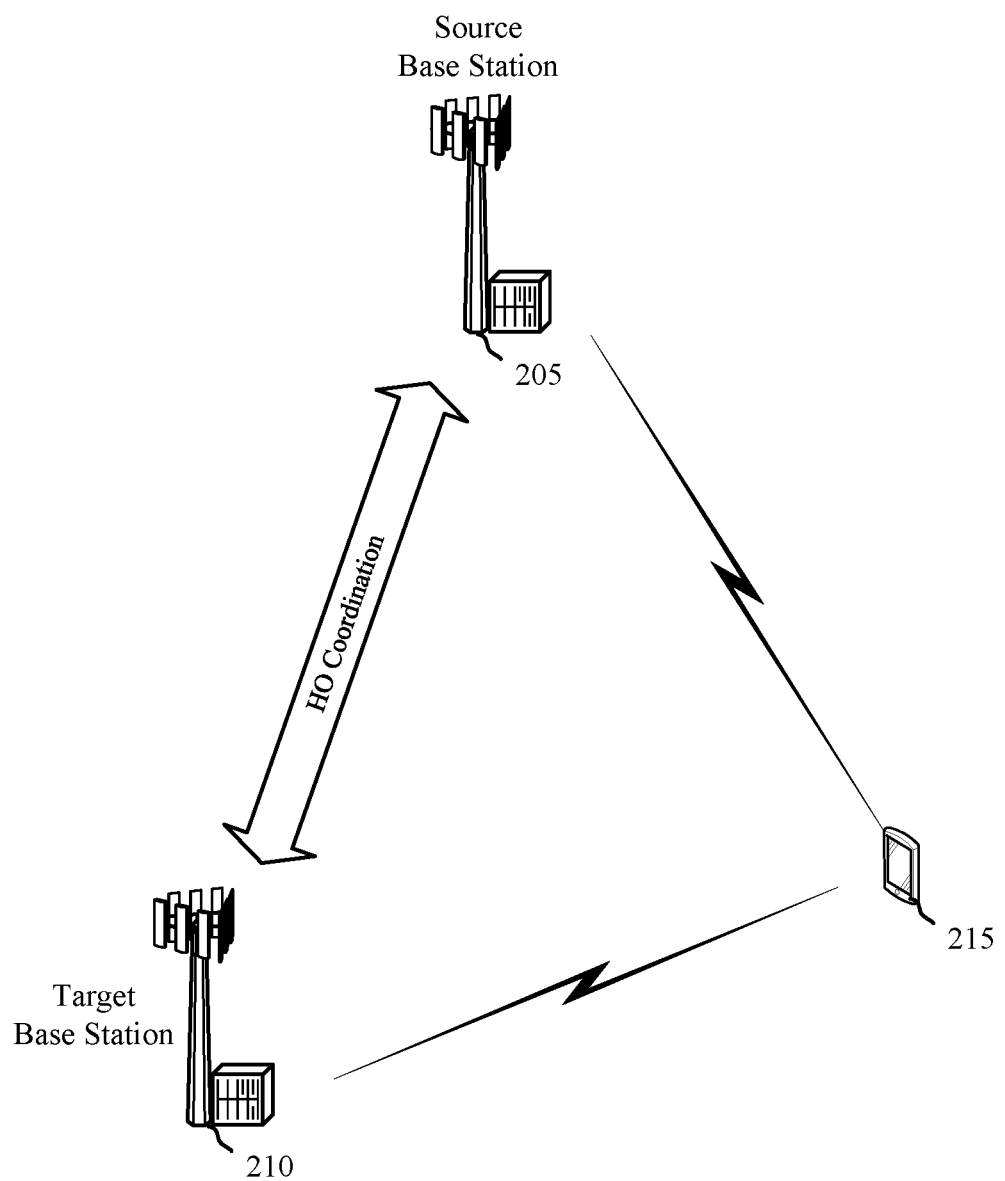
FIG. 2 illustrates an example of a wireless communication system that supports failure report for layer one or layer two based cell handover in accordance with aspects of the present disclosure.

FIG. 2 illustrates an example of a wireless communication system 200 that supports failure report for layer one or layer two based cell handover in accordance with aspects of the present disclosure. In some examples, wireless communication system 200 may implement aspects of wireless communication system 100. Wireless communication system 200 may include source base station 205, target base station 210, and/or UE 215, which may be examples of corresponding devices described herein.

Wireless communication system 200 may support L1/L2-centric inter-cell (or inter-base station) mobility where UE 215 can be handed over from source base station 205 to target base station 210. Aspects of the L1/L2-centric inter-cell mobility may be part of a multi-beam operation implemented in frequency range one (FR1) and/or frequency range two (FR2). That is, wireless communication system 200 may be configured with features to facilitate more efficient (e.g., lower latency, reduced overhead, etc.) downlink/uplink beam management to support higher intra- and/or L1/L2-centric inter-cell mobility.

In some aspects, each serving or source cell (such as source base station 205 and/or target base station 210 when acting as a source base station for another UE) may have one RRC configured serving cell identifier and one RRC configured physical cell identifier (PCI). A UE, such as UE 215, may also determine the PCI of a cell from a synchronization signal block (SSB) of the serving cell. For example, the SSB may indicate the serving cell index (ServCellIndex), a secondary cell index (SCellIndex), the PCI (PhysCellId), and the like. This information may be used by the UE during initial cell access and/or during a handover procedure where the UE is handed over from a source cell (or base station) to a target cell (or base station).

However, typically in a L1/L2-centric cell handover procedure, e.g., a change of the source base station 205, UE 215 may not receive a handover success acknowledgment message (e.g., a control signal) from the target base station 210 due to poor link quality, for example. However, UE 215 may still need to inform the network that the L1/L2 based handover procedure has failed, e.g., to avoid traffic being served by the failed target base station 210. Accordingly, aspects of the described techniques provide for a failure report to be provided in the event of an L1/L2 based cell (or base station) handover failure.

For example, UE 215 may initially have a connection established (e.g., a first connection) with source base station 205. The first connection may be established between UE 215 and base station 205 during an initial cell acquisition procedure, based on a previous handover procedure from another base station (not shown), and the like. In some aspects, the first connection may be a wireless connection implementing Uu interface protocols.

However, a determination may be made that UE 215 needs to be handed over from source base station 205 to target base station 210. Generally, the handover procedure may be designed to allow UE 215 to establish a new connection (e.g., a second connection) with target base station 210. After the handover procedure is completed, target base station 210 would become a new source base station for UE 215.

Broadly, the handover procedure may be due to UE mobility, deteriorating channel conditions, load balancing, and the like. For example, the handover procedure may be initiated based on a measurement report received from UE 215. That is, UE 215 may monitor channel conditions for its source base station 205 as well as any other neighboring base stations that are candidate target base stations, which may include target base station 210. UE 215 may periodically transmit the measurement report to source base station 205, with the measurement report identifying the channel conditions or channel performance metrics. Based on the measurement report, UE 215 and/or base station 205 may determine that UE 215 would be better served by target base station 210. Accordingly, source base station 205 and/or UE 215 may make a handover decision and initiate the handover procedure.

In another example, the handover procedure may be initiated by source base station 205 in order to provide load balancing. That is, source base station 205 may be experiencing a high traffic load, determine that target base station 210 is a suitable candidate to serve UE 215, and offload UE 215 to target base station 210 during a handover procedure in order to reduce its traffic load.

It is to be understood that other conditions may trigger the handover procedure.

Accordingly, source base station 205, target base station 210, and/or UE 215 may determine that the handover procedure is being performed to establish the second connection with target base station 210. In some aspects, the handover procedure may be a delay aware packet scheduling (DAPS) handover procedure. In some aspects, source base station 205, target base station 210, and/or UE 215 may be configured such that aspects of a handover procedure are controlled, monitored, or otherwise managed at a physical layer (e.g., L1) and/or a MAC layer (e.g., L2) of the protocol stack of the respective device. That is, each device may implement functions in hardware (e.g., a clock) and/or software at L1 that monitor various steps, messages, and/or other aspects of the handover procedure.

For example, a monitoring period may be started or otherwise instantiated at L1 (e.g., the physical layer) of each device during the handover procedure. The monitoring period may be implemented using a timer function and the like at the L1 protocol stack. Broadly, the monitoring period may define a time window for detecting a handover failure in the physical layer (e.g., L1), where the beginning and end of the time window (e.g., duration of the monitoring period) may be based on L1/L2 messages, with a handover failure report transmitted in the event that the handover is unsuccessful indicating L1 metrics.

In some aspects, the monitoring period may be configured by source base station 205. For example, source base station 205 may transmit a configuration signal (e.g., an RRC configuration signal, a MAC CE signal, a downlink control information (DCI) signal, and the like) to UE 215 that carries or otherwise conveys information identifying the duration of the monitoring period to be initiated during a handover procedure. UE 215 may initiate or otherwise begin the monitoring period based on the determination that the handover procedure is being performed. For example, the monitoring period may be initiated based on UE 215 receiving a handover command (e.g., a RRC reconfiguration signal) from source base station 205, transmitting an acknowledgment message to source base station 205 in response to the handover command, upon transmitting a RACH message to target base station 210, and the like.

In some aspects, the monitoring period may be known (e.g., preconfigured). That is, the duration of the monitoring period may be known for any device operating within wireless communication system 200, e.g., network/operator implemented as the preconfigured duration.

The handover procedure may include source base station 205 coordinating with target base station 210, e.g., to perform the admission control functions, security protocol establishment, and the like. The coordination may be performed wirelessly and/or via a backhaul connection between source base station 205 and target base station 210. Source base station 205 may transmit the handover command (e.g., an RRCConnectionReconfiguration message that includes mobility control information) to UE 215. UE 215 may respond by transmitting an acknowledgment message to source base station 205 confirming the handover procedure.

The handover procedure may include UE 215 performing a RACH procedure with target base station 210 to establish the second connection. The RACH procedure may be a four-step RACH procedure or a two-step RACH procedure.

The four-step RACH procedure may include UE 215 transmitting a RACH preamble (e.g., a RACH message one (msg1) to target base station 210 and target base station 210 responding by transmitting a random access response (RAR) message (e.g., a RACH message two (msg2). UE 215 may then transmit a RACH message 3 (msg3) to target base station 210 and target base station 210 may respond by transmitting a RACH message four (msg4). The two-step RACH procedure may include UE 215 transmitting a RACH message A (msgA) to target base station 210 and target base station 210 responding with a RACH message B (msgB).

Upon completion of the RACH procedure, target base station 210 may transmit a resource release command to UE 215 releasing any configured resources of UE 215. It is to be understood that additional steps or messages may be taken during the handover procedure by source base station 205, target base station 210, and/or UE 215.

As discussed, UE 215 may monitor, during the monitoring period instantiated at L1, for a control signal acknowledging success of the handover procedure. In some aspects, the control signal (e.g., the handover success acknowledgment) may be the resource release command transmitted from the target base station 210. In some aspects, the control signal may be the RACH msg2, RACH msg4, and/or RACH msgB transmitted from a target base station 210. In an example, the control signal (e.g., the handover success acknowledgment) may be a RACH msgB if contention free random access (CFRA) or contention-based random access (CBRA) based 4-step or 2-step RACH is performed on the target base station 210. UE 215 may monitor for the control signal (e.g., the handover success acknowledgement) during the monitoring period at L1. That is, UE 215 may initiate a function at L1 to confirm receipt of the control signal during a handover procedure. In some aspects, the control signal (e.g., the handover success acknowledgment) may be provided via L1 signaling PDCCH from target base station 210 to UE 215.

If the control signal is received during the monitoring period, the handover procedure may be considered successful and target base station 210 now becomes a new source base station for UE 215.

However, UE 215 may determine that the handover procedure was unsuccessful based on not successfully receiving and decoding the control signal during the monitoring period. In this situation, UE 215 may transmit a L1/L2 signal to the source base station 205 indicating that the handover procedure was unsuccessful. That is, UE 215 may send a handover failure report (e.g., the L1/L2 signal or physical layer/MAC layer signal) to the source base station 205 if it does not receive the handover success acknowledgment from the target base station 210 within the monitoring period. As discussed, the monitoring period may be defined as X seconds after receiving the handover command, or sending the corresponding acknowledgment to the source base station 205, or sending the first RACH preamble to target base station 210, where X a positive integer. In some aspects, X may be determined in the relevant specification (e.g., a preconfigured duration) or dynamically indicated by source base station 205 via RRC, MAC CE, a DCI, and the like, e.g., in the same handover command. The handover failure report (e.g., the L1/L2 signal) may identify the new candidate target base stations along with their corresponding link quality metrics, e.g., reference signal received power (RSRP), a reference signal received quality (RSRQ), signal-to-interference-to-noise (SINR), and the like. In some aspects, the L1 or L2 signal (e.g., the physical layer or MAC layer signal) may include a PUCCH signal, a MAC CE, and the like. In some aspects, the L1/L2 signal (e.g., the handover failure report) may be L1 signaling via PUCCH or L2 signaling in an uplink MAC CE.

After receiving the handover failure report, source base station 205 may continue to serve UE 215 via the first connection and/or may initiate another handover procedure to a new target cell (e.g., a candidate target base station identified in the handover failure report). That is, source base station 205 may continue to provide broadcast/multicast or/unicast service to UE 215 after receiving the failure report.

After sending the handover failure report, but not receiving an acknowledgment from source base station 205, UE 215 may determine that the first connection with the source base station 205 is lost (e.g., has dropped to a performance level below a threshold). In this situation, UE 215 may initiate an RRC connection reestablishment procedure by trying to resume the RRC connection with the gNB via any connectable cell that UE 215 can find.

Figure 3:
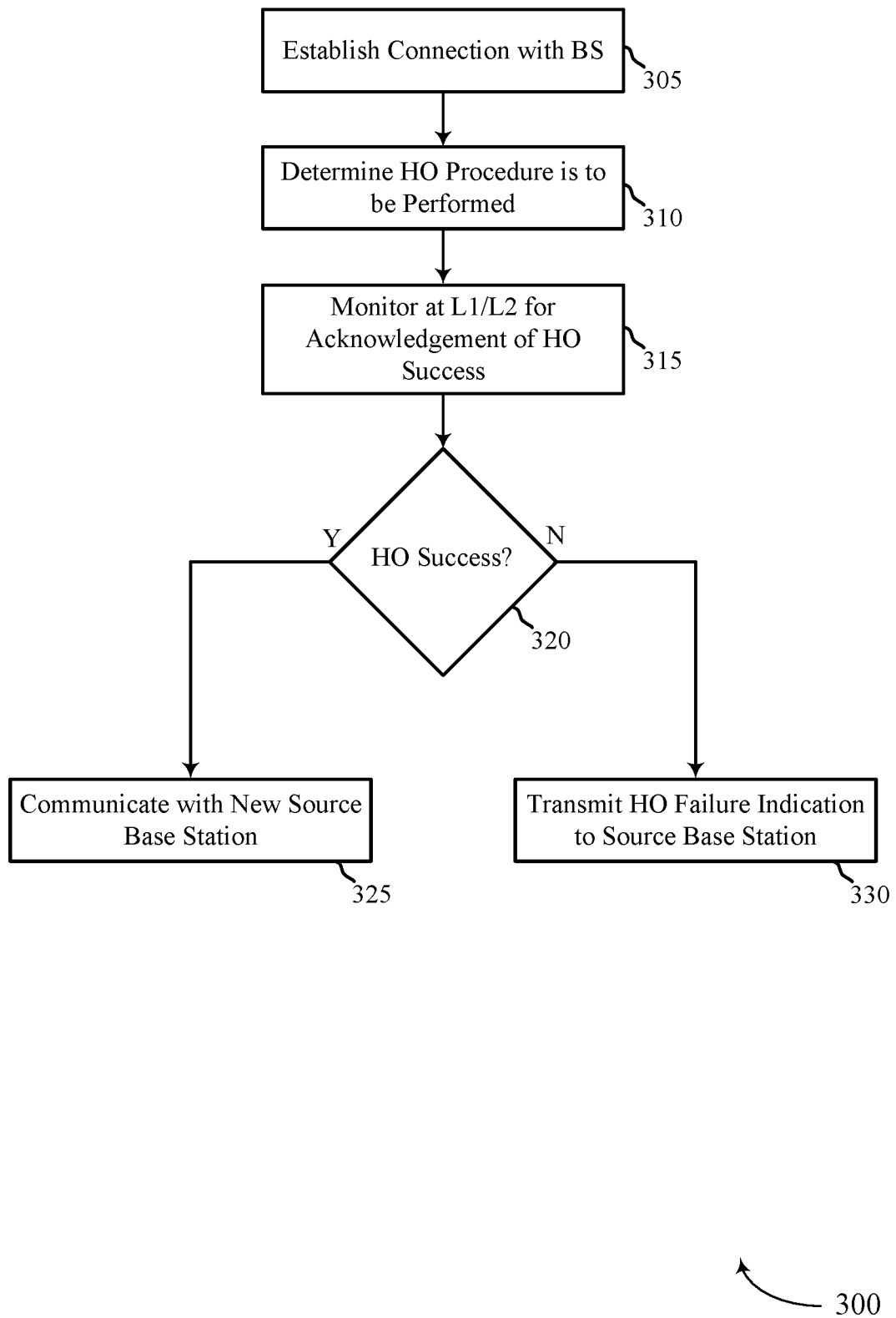
FIG. 3 illustrates an example of a method that supports failure report for layer one or layer two based cell handover in accordance with aspects of the present disclosure.

FIG. 3 illustrates an example of a method 300 that supports failure report for layer one or layer two based cell handover in accordance with aspects of the present disclosure. In some examples, method 300 may implement aspects of wireless communication systems 100 and/or 200. Aspects of method 300 may be implemented by a UE, a source base station, and/or a target base station, which may be an example of the corresponding device described herein. Broadly, method 300 is described from the perspective of the UE being handed over from the source base station to a target base station.

At 305, the UE may establish a connection (e.g., a first connection) with a source base station. In some aspects, the source base station may transmit a configuration signal to the UE that identifies a duration of a monitoring period initiated at a physical layer (e.g., L1) of a protocol stack of the UE during a handover procedure.

At 310, the UE may determine that a handover procedure is to be performed for establishing a second connection with a target base station. The handover procedure may be initiated based on a measurement report transmitted from the UE to the source base station, or triggered for any other reason. For example, the UE may transmit a measurement report to the source base station indicating that a channel measurement for the first connection fails to satisfy a performance threshold. The measurement report may identify a set of candidate target base stations that the UE has identified, along with their respective link quality metrics. The source base station may respond with a connection reestablishment message (e.g., a handover command) directing the UE to perform a RACH procedure with the target base station during the handover procedure. The UE may respond with a handover acknowledgment signal to the source base station and begin the RACH procedure with the target base station to establish the second connection. Upon completion of a RACH procedure, the source base station may transmit a resource release command to the UE releasing any configured resources. In some examples, the UE may determine that the handover procedure is being performed based at least in part on the handover command, transmitting the measurement report, other signaling, or the like.

At 315, the UE may monitor at L1 (e.g., the physical layer) for a control signal acknowledging success of the handover procedure. For example, the control signal (e.g., handover success acknowledgment) may be a signal transmitted from the target base station at L1. In another example, the control signal may be the resource release command received from the source base station.

At 320, the UE may determine whether or not the handover procedure was successful. That is, the UE may determine whether or not the control signal acknowledging success of the handover procedure was successfully received and decoded during the monitoring period instantiated for the handover procedure.

If the control signal is received during the monitoring period instantiated at L1, at 325 the UE may determine that the handover procedure was successful and begin performing wireless communications via the target base station, which is now the new source base station for the UE.

If the control signal was not received during the monitoring period, at 330 the UE may transmit a physical layer signal (e.g., an L1 signal) or a MAC layer signal (e.g., an L2 signal) to the source base station indicating that the handover procedure was unsuccessful (e.g., the handover failure report). In some aspects, the handover failure report may be a PUCCH signal, MAC CE, and the like. In some aspects, the handover report may indicate a channel performance metric for the first connection with the source base station, the second connection with the target base station, and/or any other connection with a candidate target base station(s) that the UE has identified.

Figure 4:
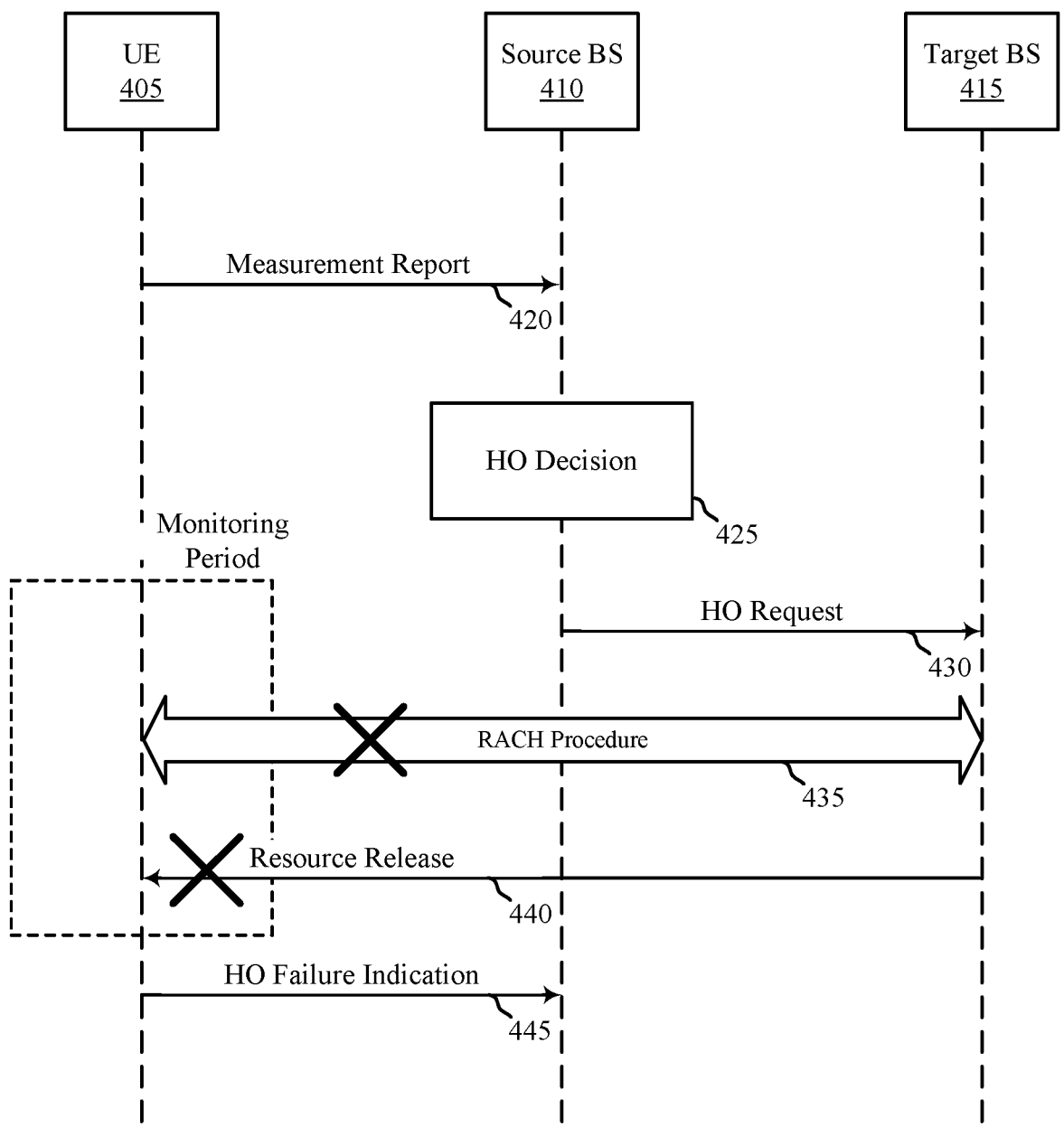
FIG. 4 illustrates an example of a process that supports failure report for layer one or layer two based cell handover in accordance with aspects of the present disclosure.

FIG. 4 illustrates an example of a process 400 that supports failure report for layer one or layer two based cell handover in accordance with aspects of the present disclosure. In some examples, process 400 may implement aspects of wireless communication systems 100 and/or 200, and/or method 300. Aspects of process 400 may be implemented by UE 405, source base station 410, and/or target base station 415, which may be examples of the corresponding devices described herein.

Broadly, process 400 illustrates an example L1/L2-centric handover procedure where UE 405 is handed over from source base station 410 to target base station 415. In the example illustrated in process 400, the handover procedure is initiated based on a measurement report indicating that the first connection between UE 405 and source base station 410 has failed to satisfy a performance threshold. However, it is to be understood that the described techniques are not limited to this particular handover triggering event, but may be implemented during any a handover procedure.

At 420, UE 405 may transmit (and the source base station 410 may receive) a measurement report. In some aspects, the measurement report may identify link metrics (e.g., channel performance metrics such as RSRP, RSRQ, SINR, and the like) for source base station 410, target base station 415, and any other candidate target base stations that UE 405 has identified.

At 425, source base station 410 may make a handover decision based on the measurement report. For example, source base station 410 may determine that the channel performance metric for the first connection between UE 405 and source base station 410 has failed to satisfy the performance threshold, and also determine that target base station 415 is a suitable candidate as a new source base station for UE 405. In some aspects, source base station 410 may transmit (and UE 405 may receive) a handover command indicating that the handover procedure is being performed, to which UE 405 may respond with an acknowledgment signal acknowledging receipt of the handover command. UE 405 may determine that the handover procedure is being performed based at least in part on the handover command, transmitting the measurement report, or other signaling.

At 430, source base station 410 may transmit (and target base station 415 may receive) a handover request signaling that the handover procedure is being performed to hand over UE 405 to target base station 415. In some aspects, the handover request may be transmitted wirelessly and/or via a backhaul connection between source base station 410 and target base station 415.

Accordingly and at 435, UE 405 and target base station 415 may perform a RACH procedure in order to establish a second connection between UE 405 and target base station 415. The RACH procedure may be a two-step RACH procedure or a four-step RACH procedure, and may include exchanging various RACH messages, e.g., msg1/msg2/msg3/msg4 or msgA/msgB, respectively.

At 440, target base station 415 may transmit a resource release command to UE 405 based on the RACH procedure being performed. The resource release command may generally signal for UE 405 to release any resources configured by source base station 410 in anticipation of UE 405 and target base station 415 communicating via the second connection. In some aspects, the resource release command may be a connection reestablishment message received from target base station 415.

As discussed above, UE 405 may initiate a monitoring period (shown as a box in dashed lines) during the handover procedure in which it monitors for a control signal from target base station 415 acknowledging success of the handover procedure. In some aspects, the control signal may be one or more of the RACH procedure messages not being received by UE 405 (as shown by the X over the RACH procedure), based on UE 405 not receiving the resource release command (also shown by the X over the resource release command), and the like.

In some aspects, the monitoring period may be initiated upon receiving the handover command from source base station 410, upon transmitting an acknowledgment to the handover command to source base station 410, upon receiving the first RACH message (e.g., msg2 or msgB) from target base station 415, and the like.

After the expiration of the monitoring period and based on the absence of the control signal from the target base station, at 445 UE 405 may transmit (and source base station 410 may receive) a physical layer signal (e.g., an L1 signal) and/or a MAC layer signal (e.g., an L2 signal) indicating that the handover procedure was unsuccessful. In some aspects, the L1/L2 signal (e.g., the handover failure report) may carry link metrics that the UE has detected for the source base station 410, target base station 415, and any other candidate target base stations at the UE has identified.

In some aspects, UE 405 may receive an acknowledgment message from source base station 410 acknowledging receipt of the L1/L2 signal. In this situation, UE 405 and source base station 410 may continue to communicate over the first connection and/or source base station 410 may identify a new target base station for UE 405 to be handed over to.

In some aspects, UE 405 may not receive the acknowledgment message from source base station 410 acknowledging receipt of the L1/L2 signal. In this situation, UE 405 may initiate a connection reestablishment procedure to establish a new connection with source base station 410, target base station 415, or another candidate target base station that UE 405 has identified.

Figure 5:
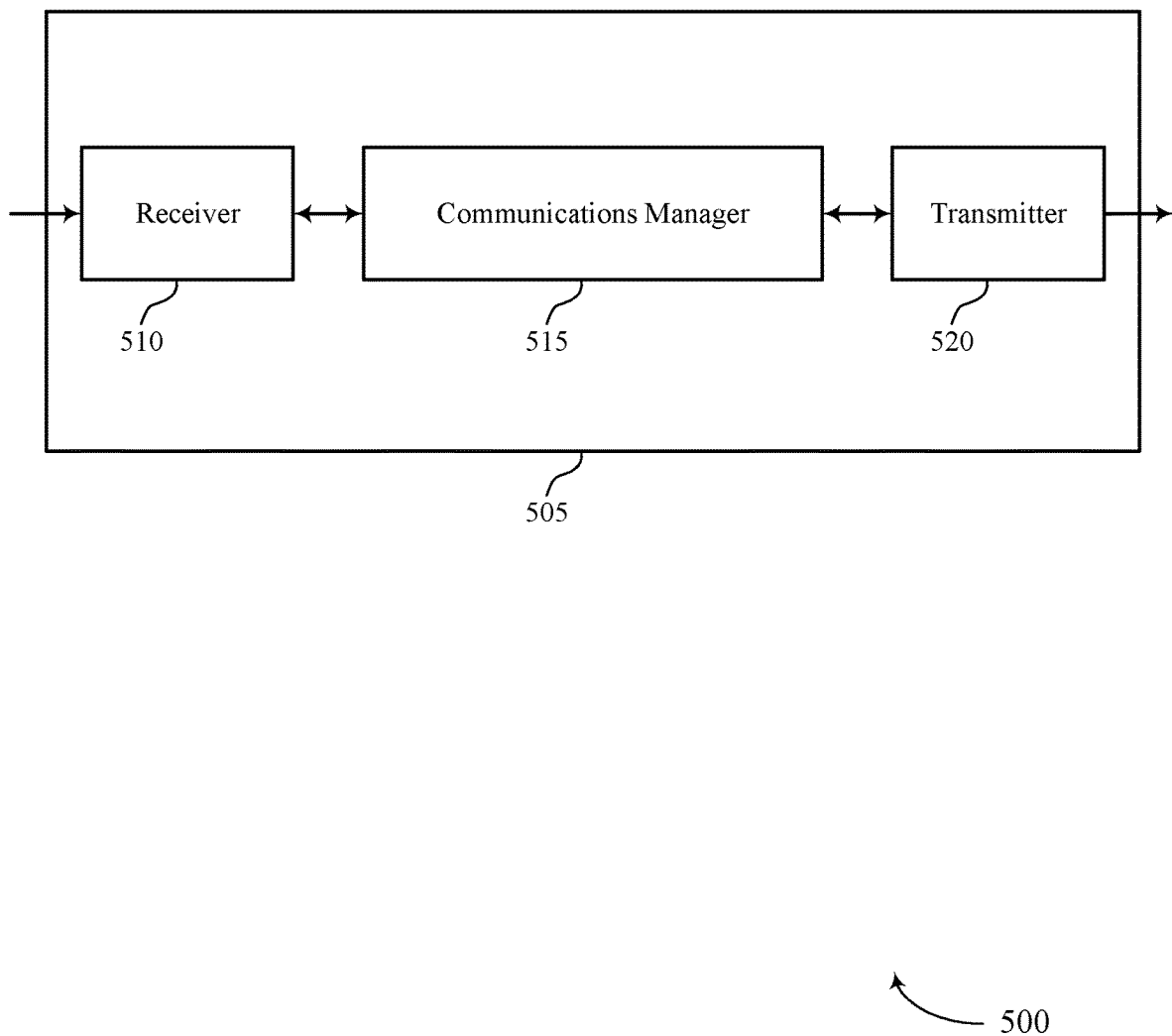
FIGS. 5 and 6 show block diagrams of devices that support failure report for layer one or layer two based cell handover in accordance with aspects of the present disclosure.

FIG. 5 shows a block diagram 500 of a device 505 that supports failure report for layer one or layer two based cell handover in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to failure report for layer one or layer two based cell handover, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may establish a first connection with a source base station, determine that a handover procedure is being performed for establishing a second connection with a target base station, monitor, during a monitoring period instantiated at a physical layer of a protocol stack of the UE, for a control signal acknowledging success of the handover procedure from a target base station, and transmit, based on a result of the monitoring during the monitoring period, a physical layer signal or a MAC layer signal to the source base station indicating that the handover procedure was unsuccessful based on a failure to successfully receive and decode the control signal. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

By including or configuring the communications manager 515 in accordance with examples as described herein, the device 505 (e.g., a processor controlling or otherwise coupled to the receiver 510, the transmitter 520, the communications manager 515, or a combination thereof) may support techniques for L1/L2-based handover failure reporting. For example, aspects of the described techniques provide various mechanisms that mitigate/eliminate data loss at the UE being handed over, reduce latency associated with a handover procedure, minimize processing, and the like.

Figure 6:
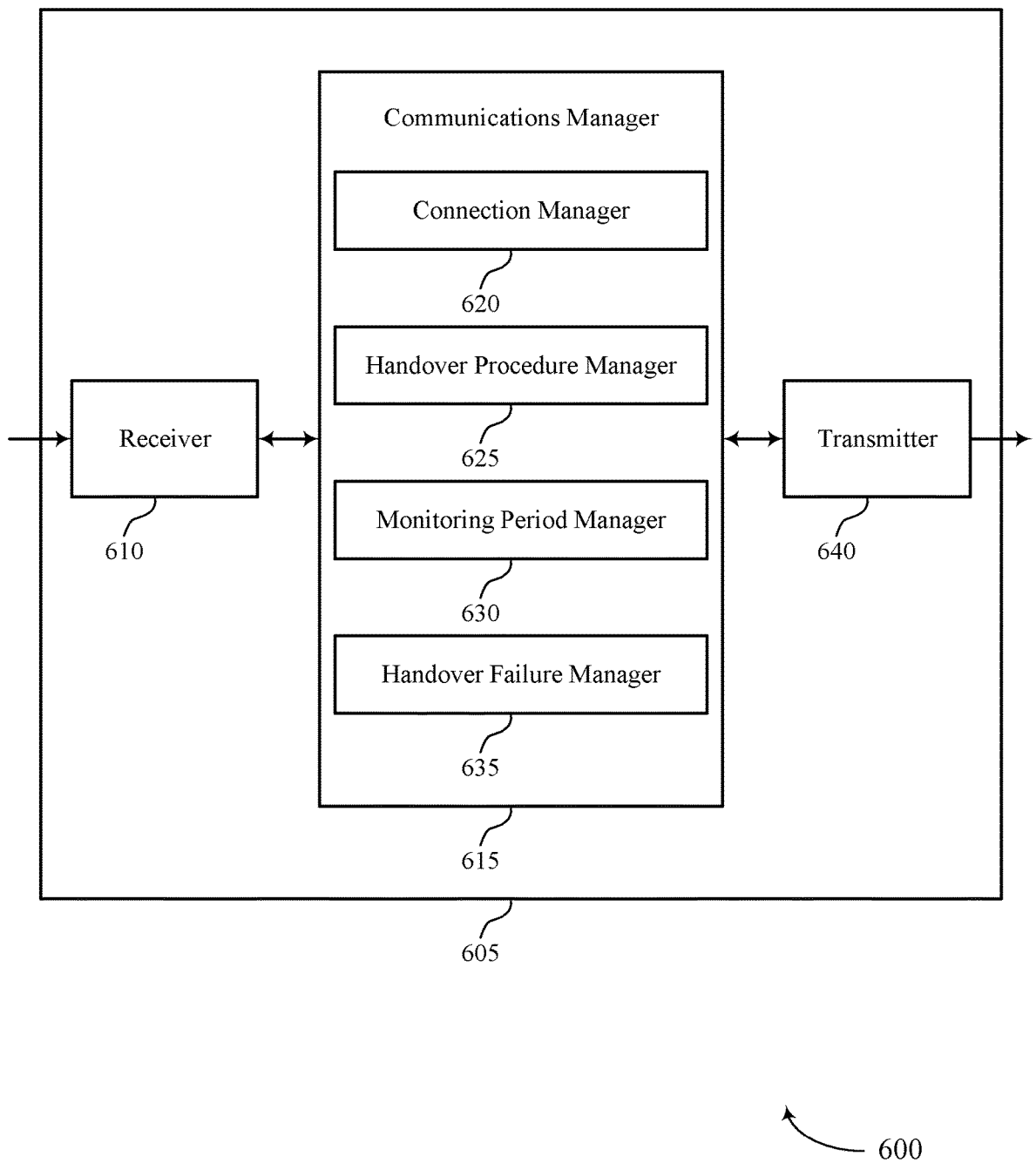

FIG. 6 shows a block diagram 600 of a device 605 that supports failure report for layer one or layer two based cell handover in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to failure report for layer one or layer two based cell handover, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a connection manager 620, a handover procedure manager 625, a monitoring period manager 630, and a handover failure manager 635. The communications manager 615 may be an example of aspects of the communications manager 810 described herein.

The connection manager 620 may establish a first connection with a source base station.

The handover procedure manager 625 may determine that a handover procedure is being performed for establishing a second connection with a target base station.

The monitoring period manager 630 may monitor, during a monitoring period instantiated at a physical layer of a protocol stack of the UE, for a control signal acknowledging success of the handover procedure from a target base station.

The handover failure manager 635 may transmit, based on a result of the monitoring during the monitoring period, a physical layer signal or a MAC layer signal to the source base station indicating that the handover procedure was unsuccessful based on a failure to successfully receive and decode the control signal.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
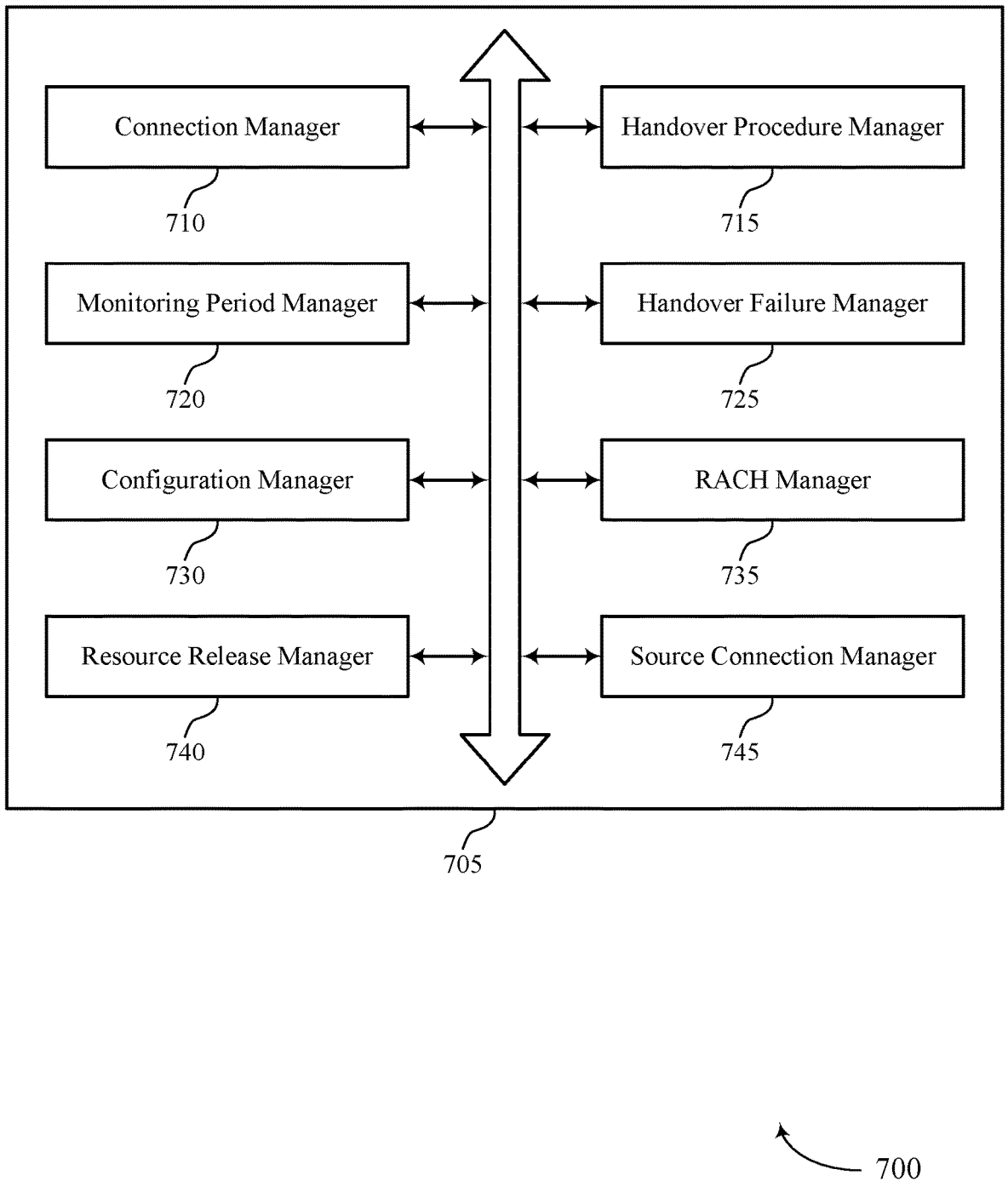
FIG. 7 shows a block diagram of a communications manager that supports failure report for layer one or layer two based cell handover in accordance with aspects of the present disclosure.

FIG. 7 shows a block diagram 700 of a communications manager 705 that supports failure report for layer one or layer two based cell handover in accordance with aspects of the present disclosure. The communications manager 705 may be an example of aspects of a communications manager 515, a communications manager 615, or a communications manager 810 described herein. The communications manager 705 may include a connection manager 710, a handover procedure manager 715, a monitoring period manager 720, a handover failure manager 725, a configuration manager 730, a RACH manager 735, a resource release manager 740, and a source connection manager 745. Each of these modules may communicate, directly or indirectly, with one another (e.g., via one or more buses).

The connection manager 710 may establish a first connection with a source base station.

The handover procedure manager 715 may determine that a handover procedure is being performed for establishing a second connection with a target base station.

The monitoring period manager 720 may monitor, during a monitoring period instantiated at a physical layer of a protocol stack of the UE, for a control signal acknowledging success of the handover procedure from a target base station. In some examples, the monitoring period manager 720 may identify a duration for the monitoring period initiated during the handover procedure as a preconfigured duration. In some cases, the control signal includes a handover success acknowledgement signal transmitted from the target base station at the physical layer.

The handover failure manager 725 may transmit, based on a result of the monitoring during the monitoring period, a physical layer signal or a MAC layer signal to the source base station indicating that the handover procedure was unsuccessful based on a failure to successfully receive and decode the control signal. In some cases, the physical layer signal or the MAC layer signal includes at least one of a PUCCH signal, or a MAC CE signal, or a combination thereof. In some cases, the physical layer signal or the MAC layer signal indicates a channel performance metric for at least one of the first connection with the source base station, the second connection with the target base station, a connection with a candidate target base station, or a combination thereof. In some cases, the channel performance metric includes at least one of a RSRP, or a RSRQ, or a SINR, or a combination thereof.

The configuration manager 730 may receive a configuration signal from the source base station identifying a duration for the monitoring period initiated during the handover procedure. In some examples, the configuration manager 730 may initiate the monitoring period at the physical layer based on the handover procedure, where the physical layer signal or the MAC layer signal is transmitted based on expiration of the monitoring period without successfully receiving and decoding the control signal. In some cases, the configuration signal includes at least one of a RRC signal, or a MAC CE, or a DCI, or a combination thereof. In some cases, the monitoring period is initiated based on at least one of receiving a handover command from the source base station, or transmitting an acknowledgement message in response to the handover command to the source base station, or transmitting a first RACH message to the target base station, or a combination thereof.

The RACH manager 735 may perform, during the handover procedure, a RACH procedure with the target base station, where the handover procedure being unsuccessful is based on a failure to successfully receive and decode a RACH message from the target base station during the RACH procedure, the RACH message including the control signal. In some cases, the RACH message includes at least one of a RACH msg2 of a four-step RACH procedure, or a RACH msg4 of the four-step RACH procedure, or a RACH msgB of a two-step RACH procedure, or a combination thereof.

The resource release manager 740 may identify, during the handover procedure, a failure to successfully receive and decode a resource release command from the target base station during the handover procedure, where the handover procedure being unsuccessful is based on the absence of the resource release command, the resource release command including the control signal. In some cases, the resource release command includes a connection reestablishment message received from the target base station.

The source connection manager 745 may determine that an acknowledgement message was not received from the source base station acknowledging receipt of the physical layer signal or the MAC signal. In some examples, the source connection manager 745 may determine, based on the absence of the acknowledgement message, that the first connection with the source base station has failed. In some examples, the source connection manager 745 may initiate a connection reestablishment procedure to establish a new connection with the source base station, or the target base station, or a candidate target base station.

Figure 8:
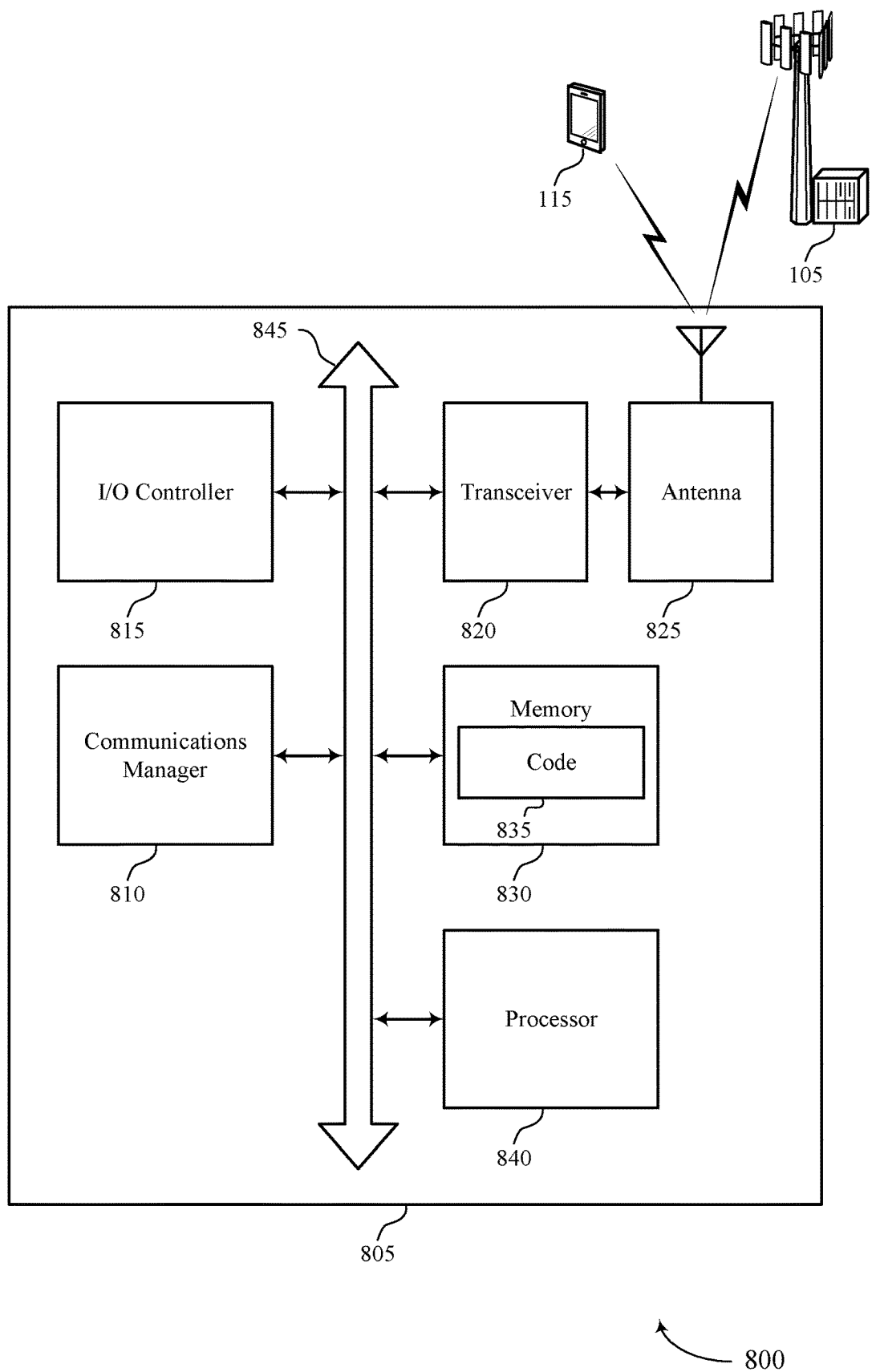
FIG. 8 shows a diagram of a system including a device that supports failure report for layer one or layer two based cell handover in accordance with aspects of the present disclosure.

FIG. 8 shows a diagram of a system 800 including a device 805 that supports failure report for layer one or layer two based cell handover in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may establish a first connection with a source base station, determine that a handover procedure is being performed for establishing a second connection with a target base station, monitor, during a monitoring period instantiated at a physical layer of a protocol stack of the UE, for a control signal acknowledging success of the handover procedure from a target base station, and transmit, based on a result of the monitoring during the monitoring period, a physical layer signal or a MAC layer signal to the source base station indicating that the handover procedure was unsuccessful based on a failure to successfully receive and decode the control signal.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting failure report for layer one or layer two based cell handover).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
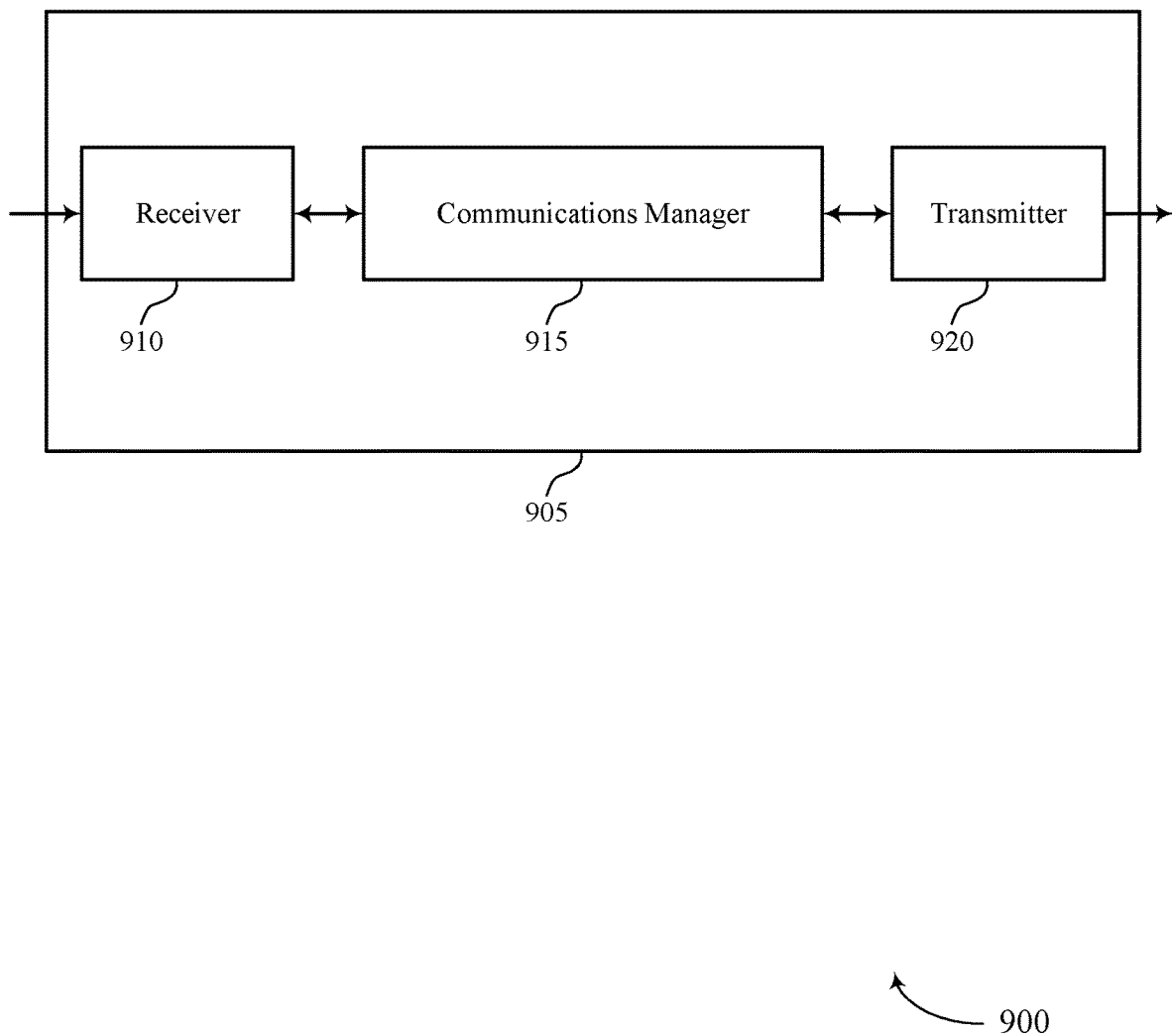
FIGS. 9 and 10 show block diagrams of devices that support failure report for layer one or layer two based cell handover in accordance with aspects of the present disclosure.

FIG. 9 shows a block diagram 900 of a device 905 that supports failure report for layer one or layer two based cell handover in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to failure report for layer one or layer two based cell handover, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may establish a first connection with a UE, transmit a configuration signal to the UE identifying a duration of a monitoring period initiated at a physical layer of a protocol stack of the UE during a handover procedure, initiate the handover procedure with the UE and a target base station for the UE to establish a second connection with the target base station, and receive a physical layer signal or a MAC layer signal from the UE indicating that the handover procedure was unsuccessful based on a failure of the UE to successfully receive and decode a control signal from the target base station during the monitoring period. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

By including or configuring the communications manager 915 in accordance with examples as described herein, the device 905 (e.g., a processor controlling or otherwise coupled to the receiver 910, the transmitter 920, the communications manager 915, or a combination thereof) may support techniques for L1/L2-based handover failure reporting. For example, aspects of the described techniques provide various mechanisms that mitigate/eliminate data loss at the UE being handed over, reduce latency associated with a handover procedure, minimize processing, and the like.

Figure 10:
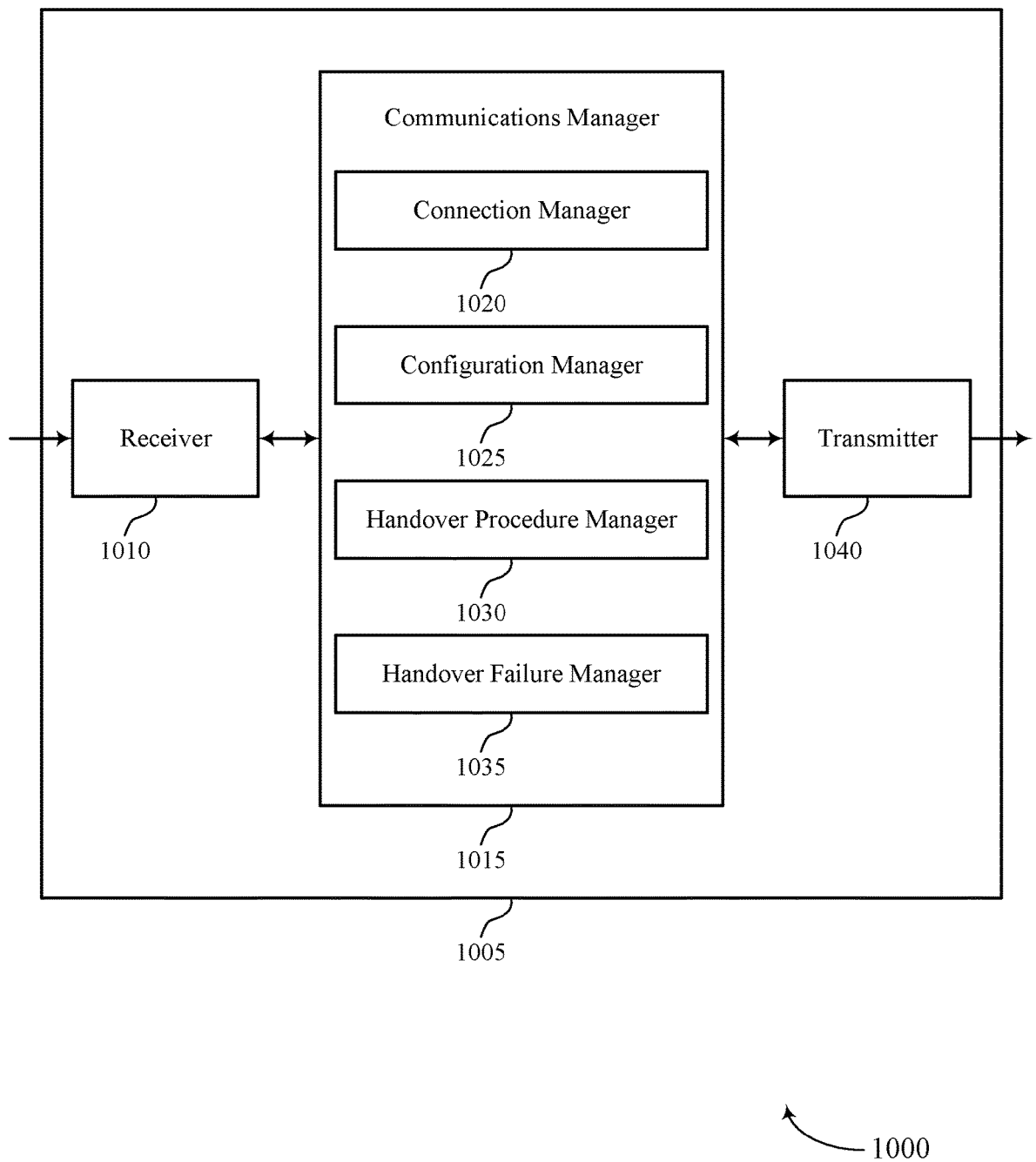

FIG. 10 shows a block diagram 1000 of a device 1005 that supports failure report for layer one or layer two based cell handover in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to failure report for layer one or layer two based cell handover, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a connection manager 1020, a configuration manager 1025, a handover procedure manager 1030, and a handover failure manager 1035. The communications manager 1015 may be an example of aspects of the communications manager 1210 described herein.

The connection manager 1020 may establish a first connection with a UE.

The configuration manager 1025 may transmit a configuration signal to the UE identifying a duration of a monitoring period initiated at a physical layer of a protocol stack of the UE during a handover procedure.

The handover procedure manager 1030 may initiate the handover procedure with the UE and a target base station for the UE to establish a second connection with the target base station.

The handover failure manager 1035 may receive a physical layer signal or a MAC layer signal from the UE indicating that the handover procedure was unsuccessful based on a failure of the UE to successfully receive and decode a control signal from the target base station during the monitoring period.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
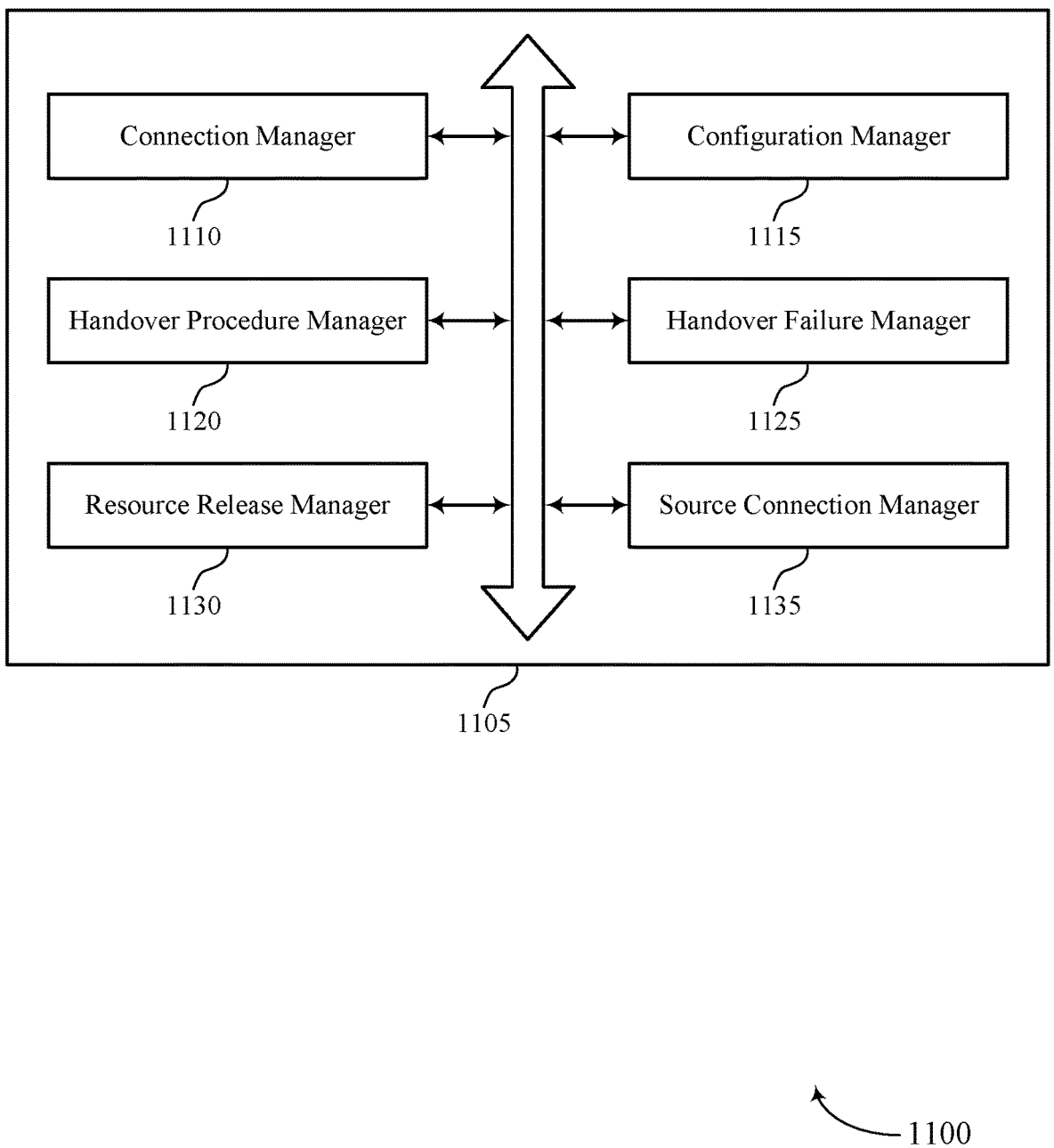
FIG. 11 shows a block diagram of a communications manager that supports failure report for layer one or layer two based cell handover in accordance with aspects of the present disclosure.

FIG. 11 shows a block diagram 1100 of a communications manager 1105 that supports failure report for layer one or layer two based cell handover in accordance with aspects of the present disclosure. The communications manager 1105 may be an example of aspects of a communications manager 915, a communications manager 1015, or a communications manager 1210 described herein. The communications manager 1105 may include a connection manager 1110, a configuration manager 1115, a handover procedure manager 1120, a handover failure manager 1125, a resource release manager 1130, and a source connection manager 1135. Each of these modules may communicate, directly or indirectly, with one another (e.g., via one or more buses).

The connection manager 1110 may establish a first connection with a UE.

The configuration manager 1115 may transmit a configuration signal to the UE identifying a duration of a monitoring period initiated at a physical layer of a protocol stack of the UE during a handover procedure. In some examples, the configuration manager 1115 may identify the duration of the monitoring period initiated during the handover procedure as a preconfigured duration. In some cases, the configuration signal includes at least one of a RRC signal, or a MAC CE, or a DCI, or a combination thereof.

The handover procedure manager 1120 may initiate the handover procedure with the UE and a target base station for the UE to establish a second connection with the target base station.

The handover failure manager 1125 may receive a physical layer signal or a MAC layer signal from the UE indicating that the handover procedure was unsuccessful based on a failure of the UE to successfully receive and decode a control signal from the target base station during the monitoring period. In some cases, the physical layer signal or the MAC layer signal includes at least one of a PUCCH layer signal, or a MAC CE signal, or a combination thereof. In some cases, the physical layer signal or the MAC layer signal indicates a channel performance metric for at least one of the first connection with the source base station, the second connection with the target base station, a connection with a candidate target base station, or a combination thereof. In some cases, the channel performance metric includes at least one of a RSRP, or a RSRQ, or a SINR, or a combination thereof.

The resource release manager 1130 may determine that a resource release command was not transmitted to the UE from the target base station during the handover procedure, where the handover procedure being unsuccessful is based on the absence of the resource release command, the resource release command including the control signal. In some cases, the resource release command includes a connection reestablishment message.

The source connection manager 1135 may transmit an acknowledgment message to the UE acknowledging receipt of the physical layer signal or the MAC signal. In some examples, the source connection manager 1135 may continue to perform wireless communications with the UE over the first connection. In some examples, the source connection manager 1135 may transmit an acknowledgment message to the UE acknowledging receipt of the physical layer signal or the MAC signal. In some examples, the source connection manager 1135 may identify a new target base station for the UE based on the physical layer signal or the MAC signal. In some examples, the source connection manager 1135 may initiate a second handover procedure with the UE and the new target base station for the UE to establish a third connection with the new target base station.

Figure 12:
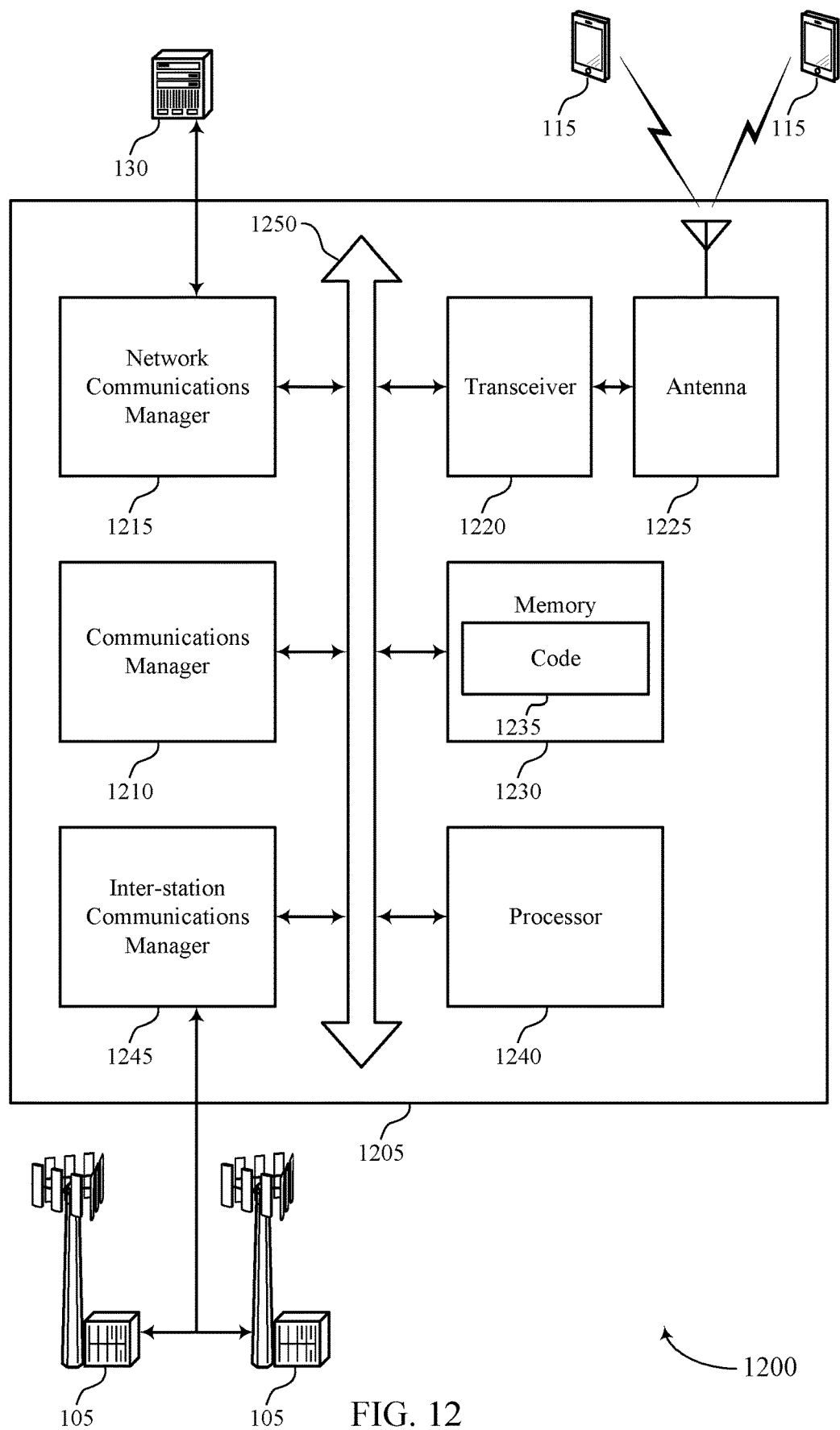
FIG. 12 shows a diagram of a system including a device that supports failure report for layer one or layer two based cell handover in accordance with aspects of the present disclosure.

FIG. 12 shows a diagram of a system 1200 including a device 1205 that supports failure report for layer one or layer two based cell handover in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may establish a first connection with a UE, transmit a configuration signal to the UE identifying a duration of a monitoring period initiated at a physical layer of a protocol stack of the UE during a handover procedure, initiate the handover procedure with the UE and a target base station for the UE to establish a second connection with the target base station, and receive a physical layer signal or a MAC layer signal from the UE indicating that the handover procedure was unsuccessful based on a failure of the UE to successfully receive and decode a control signal from the target base station during the monitoring period.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting failure report for layer one or layer two based cell handover).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
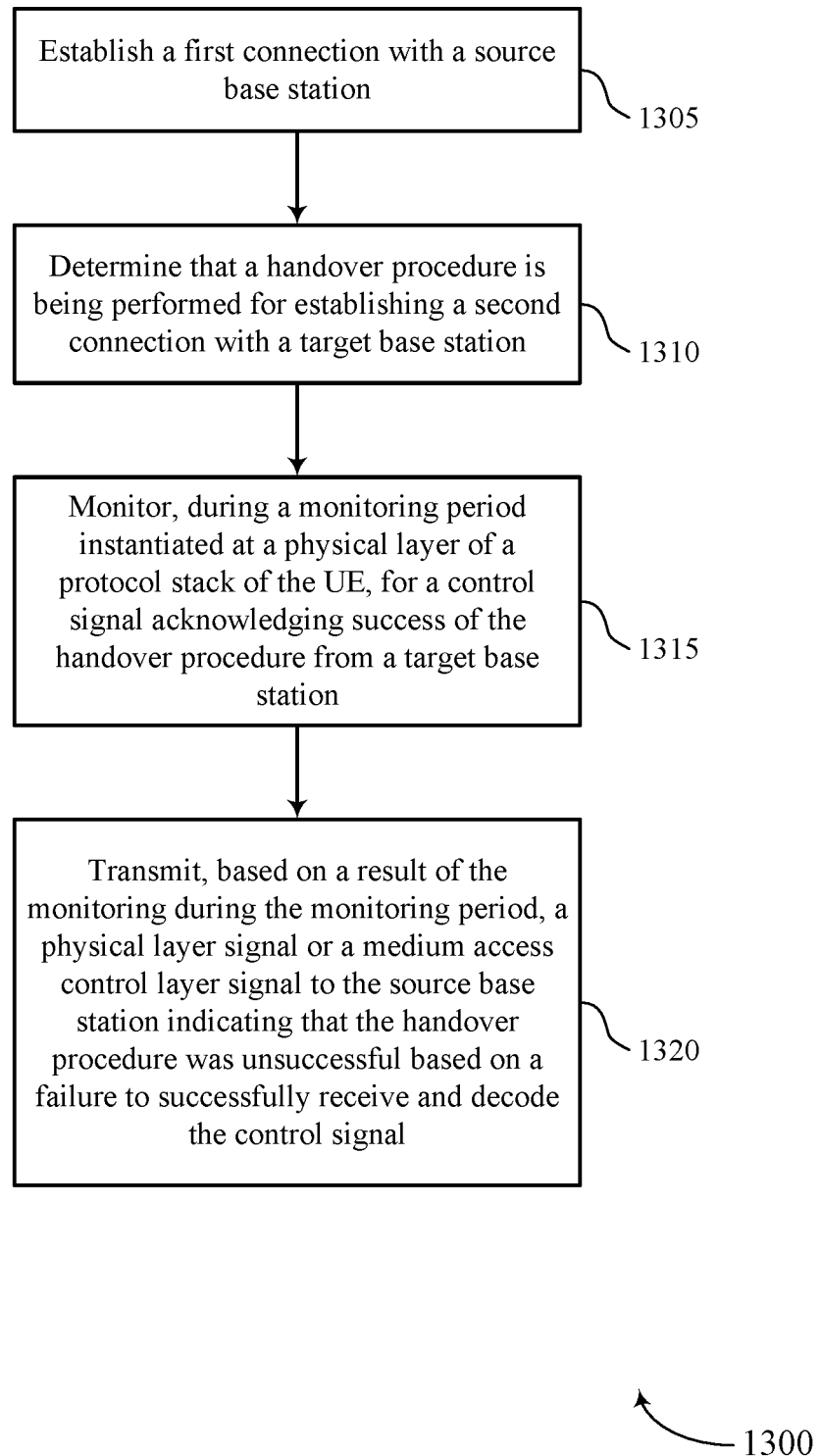
FIGS. 13 through 17 show flowcharts illustrating methods that support failure report for layer one or layer two based cell handover in accordance with aspects of the present disclosure.

FIG. 13 shows a flowchart illustrating a method 1300 that supports failure report for layer one or layer two based cell handover in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may establish a first connection with a source base station. The operations of 1305 may be performed according to the methods described herein. In some examples, aspects of the operations of 1305 may be performed by a connection manager as described with reference to FIGS. 5 through 8.

At 1310, the UE may determine that a handover procedure is being performed for establishing a second connection with a target base station. The operations of 1310 may be performed according to the methods described herein. In some examples, aspects of the operations of 1310 may be performed by a handover procedure manager as described with reference to FIGS. 5 through 8.

At 1315, the UE may monitor, during a monitoring period instantiated at a physical layer of a protocol stack of the UE, for a control signal acknowledging success of the handover procedure from a target base station. The operations of 1315 may be performed according to the methods described herein. In some examples, aspects of the operations of 1315 may be performed by a monitoring period manager as described with reference to FIGS. 5 through 8.

At 1320, the UE may transmit, based on a result of the monitoring during the monitoring period, a physical layer signal or a MAC layer signal to the source base station indicating that the handover procedure was unsuccessful based on a failure to successfully receive and decode the control signal. The operations of 1320 may be performed according to the methods described herein. In some examples, aspects of the operations of 1320 may be performed by a handover failure manager as described with reference to FIGS. 5 through 8.

Figure 14:
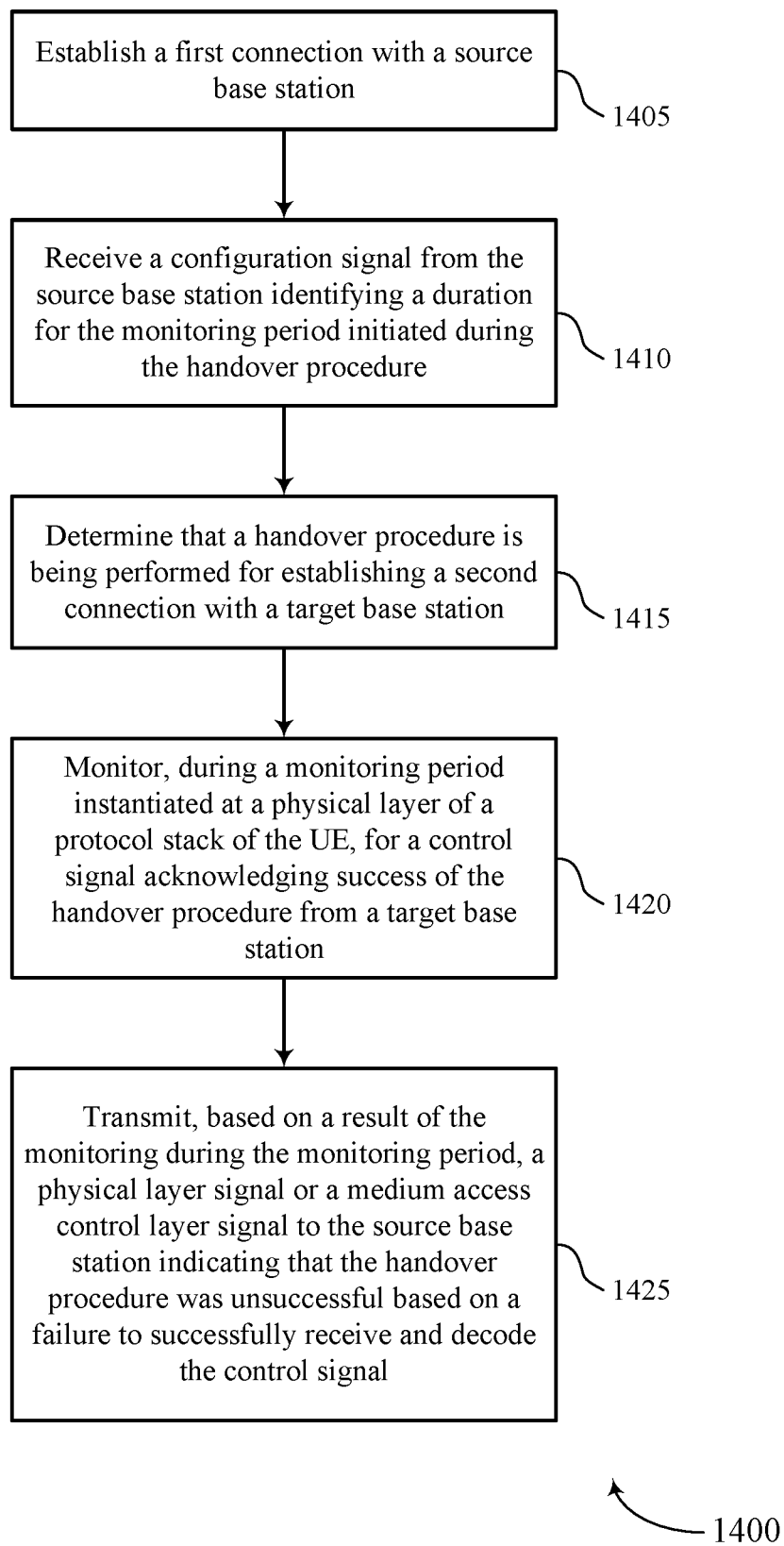

FIG. 14 shows a flowchart illustrating a method 1400 that supports failure report for layer one or layer two based cell handover in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may establish a first connection with a source base station. The operations of 1405 may be performed according to the methods described herein. In some examples, aspects of the operations of 1405 may be performed by a connection manager as described with reference to FIGS. 5 through 8.

At 1410, the UE may receive a configuration signal from the source base station identifying a duration for the monitoring period initiated during the handover procedure. The operations of 1410 may be performed according to the methods described herein. In some examples, aspects of the operations of 1410 may be performed by a configuration manager as described with reference to FIGS. 5 through 8.

At 1415, the UE may determine that a handover procedure is being performed for establishing a second connection with a target base station. The operations of 1415 may be performed according to the methods described herein. In some examples, aspects of the operations of 1415 may be performed by a handover procedure manager as described with reference to FIGS. 5 through 8.

At 1420, the UE may monitor, during a monitoring period instantiated at a physical layer of a protocol stack of the UE, for a control signal acknowledging success of the handover procedure from a target base station. The operations of 1420 may be performed according to the methods described herein. In some examples, aspects of the operations of 1420 may be performed by a monitoring period manager as described with reference to FIGS. 5 through 8.

At 1425, the UE may transmit, based on a result of the monitoring during the monitoring period, a physical layer signal or a MAC layer signal to the source base station indicating that the handover procedure was unsuccessful based on a failure to successfully receive and decode the control signal. The operations of 1425 may be performed according to the methods described herein. In some examples, aspects of the operations of 1425 may be performed by a handover failure manager as described with reference to FIGS. 5 through 8.

Figure 15:
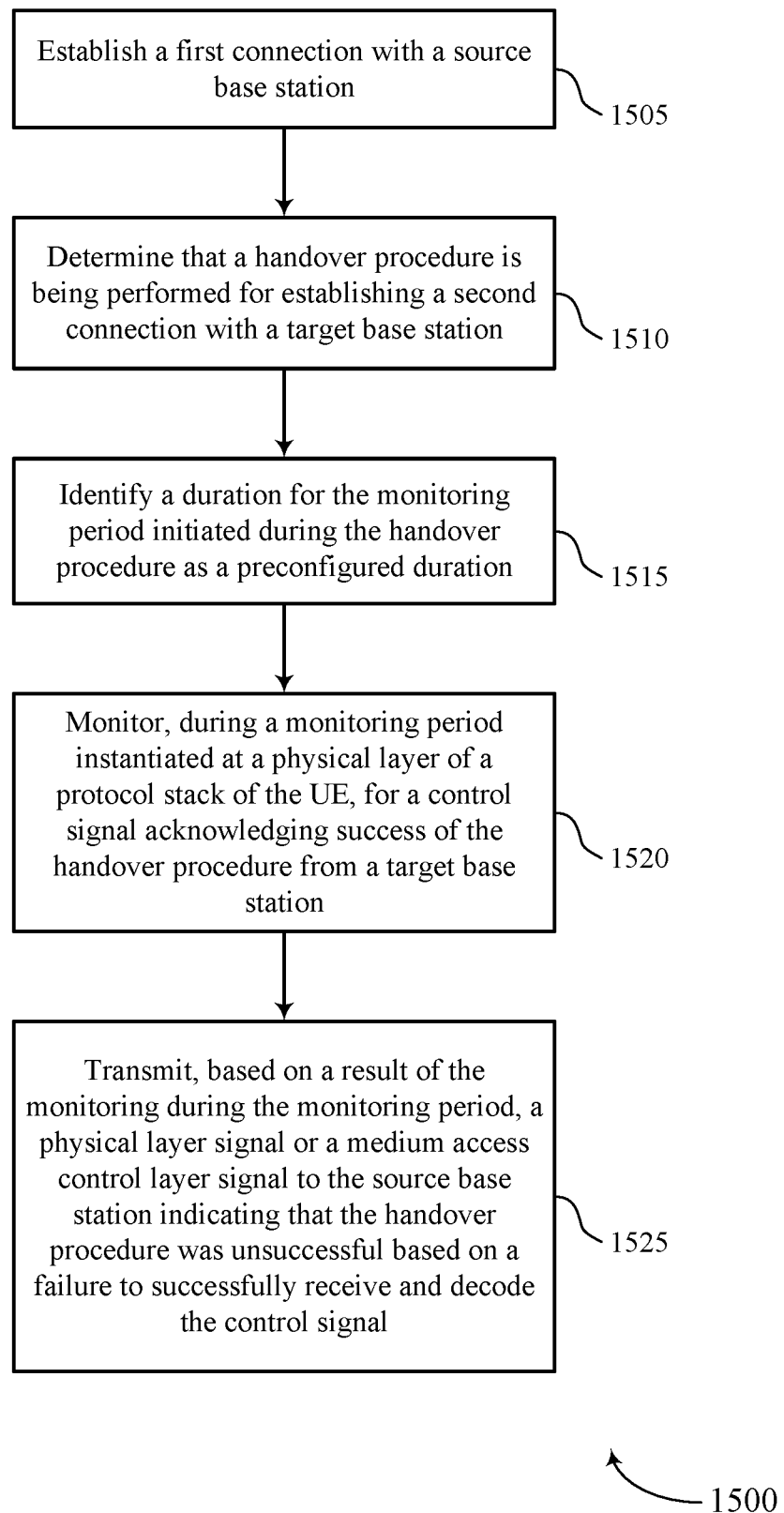

FIG. 15 shows a flowchart illustrating a method 1500 that supports failure report for layer one or layer two based cell handover in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may establish a first connection with a source base station. The operations of 1505 may be performed according to the methods described herein. In some examples, aspects of the operations of 1505 may be performed by a connection manager as described with reference to FIGS. 5 through 8.

At 1510, the UE may determine that a handover procedure is being performed for establishing a second connection with a target base station. The operations of 1510 may be performed according to the methods described herein. In some examples, aspects of the operations of 1510 may be performed by a handover procedure manager as described with reference to FIGS. 5 through 8.

At 1515, the UE may identify a duration for the monitoring period initiated during the handover procedure as a preconfigured duration. The operations of 1515 may be performed according to the methods described herein. In some examples, aspects of the operations of 1515 may be performed by a monitoring period manager as described with reference to FIGS. 5 through 8.

At 1520, the UE may monitor, during a monitoring period instantiated at a physical layer of a protocol stack of the UE, for a control signal acknowledging success of the handover procedure from a target base station. The operations of 1520 may be performed according to the methods described herein. In some examples, aspects of the operations of 1520 may be performed by a monitoring period manager as described with reference to FIGS. 5 through 8.

At 1525, the UE may transmit, based on a result of the monitoring during the monitoring period, a physical layer signal or a MAC layer signal to the source base station indicating that the handover procedure was unsuccessful based on a failure to successfully receive and decode the control signal. The operations of 1525 may be performed according to the methods described herein. In some examples, aspects of the operations of 1525 may be performed by a handover failure manager as described with reference to FIGS. 5 through 8.

Figure 16:
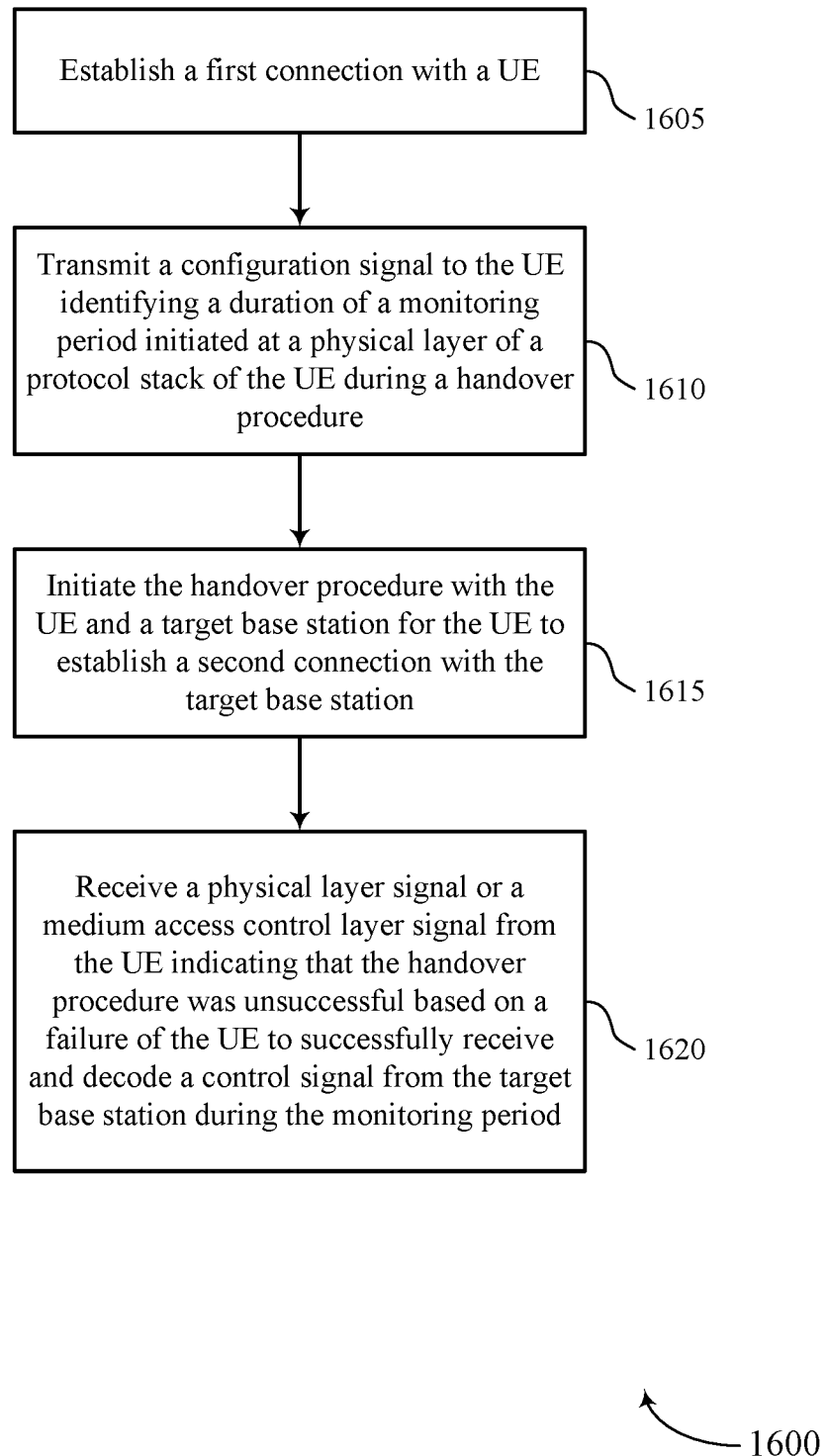

FIG. 16 shows a flowchart illustrating a method 1600 that supports failure report for layer one or layer two based cell handover in accordance with aspects of the present disclosure. The operations of method 1600 may be implemented by a base station 105 or its components as described herein. For example, the operations of method 1600 may be performed by a communications manager as described with reference to FIGS. 9 through 12.

In some examples, a base station may execute a set of instructions to control the functional elements of the base station to perform the functions described below. Additionally or alternatively, a base station may perform aspects of the functions described below using special-purpose hardware.

At 1605, the base station may establish a first connection with a UE. The operations of 1605 may be performed according to the methods described herein. In some examples, aspects of the operations of 1605 may be performed by a connection manager as described with reference to FIGS. 9 through 12.

At 1610, the base station may transmit a configuration signal to the UE identifying a duration of a monitoring period initiated at a physical layer of a protocol stack of the UE during a handover procedure. The operations of 1610 may be performed according to the methods described herein. In some examples, aspects of the operations of 1610 may be performed by a configuration manager as described with reference to FIGS. 9 through 12.

At 1615, the base station may initiate the handover procedure with the UE and a target base station for the UE to establish a second connection with the target base station. The operations of 1615 may be performed according to the methods described herein. In some examples, aspects of the operations of 1615 may be performed by a handover procedure manager as described with reference to FIGS. 9 through 12.

At 1620, the base station may receive a physical layer signal or a MAC layer signal from the UE indicating that the handover procedure was unsuccessful based on a failure of the UE to successfully receive and decode a control signal from the target base station during the monitoring period. The operations of 1620 may be performed according to the methods described herein. In some examples, aspects of the operations of 1620 may be performed by a handover failure manager as described with reference to FIGS. 9 through 12.

Figure 17:
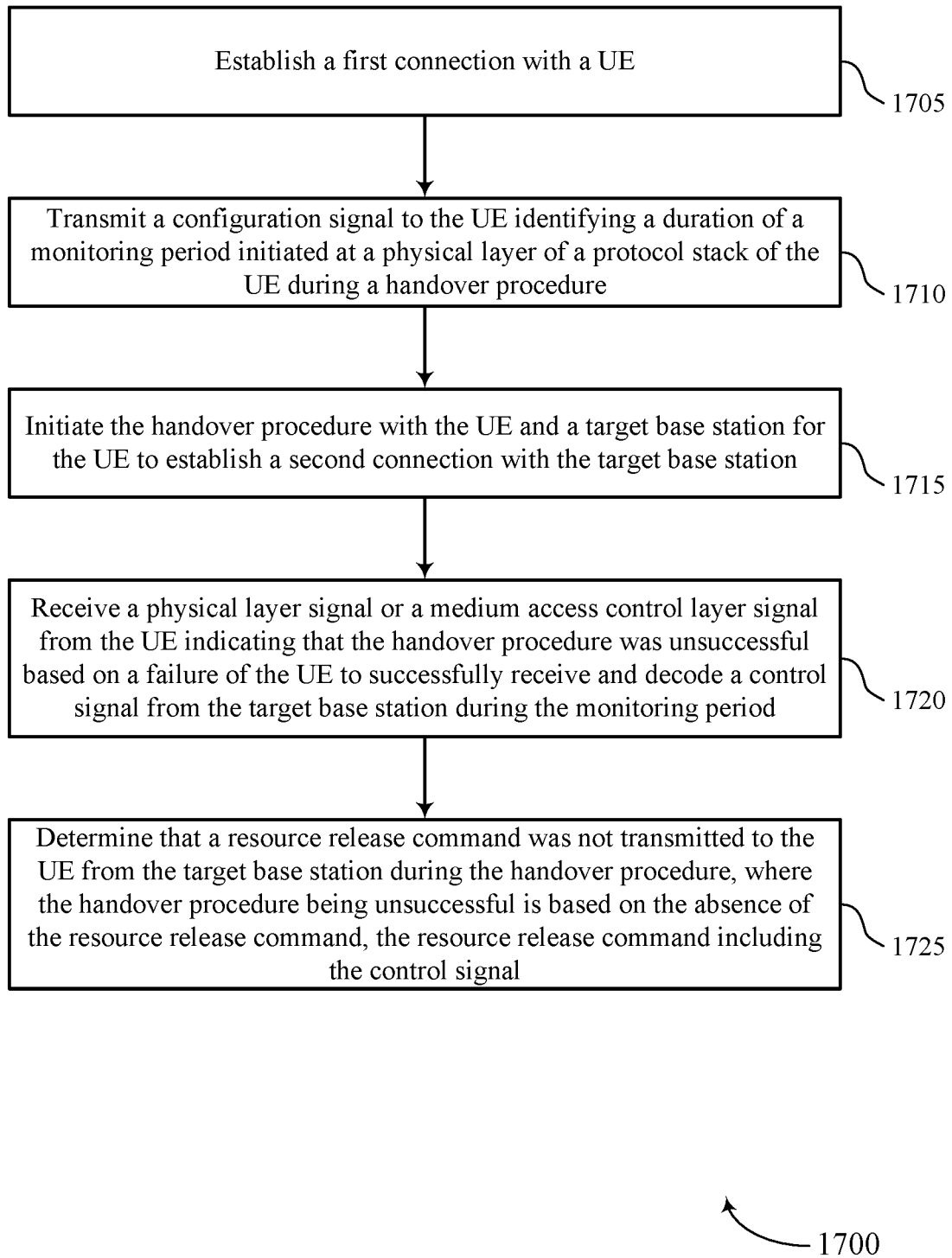

FIG. 17 shows a flowchart illustrating a method 1700 that supports failure report for layer one or layer two based cell handover in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may establish a first connection with a UE. The operations of 1705 may be performed according to the methods described herein. In some examples, aspects of the operations of 1705 may be performed by a connection manager as described with reference to FIGS. 9 through 12.

At 1710, the base station may transmit a configuration signal to the UE identifying a duration of a monitoring period initiated at a physical layer of a protocol stack of the UE during a handover procedure. The operations of 1710 may be performed according to the methods described herein. In some examples, aspects of the operations of 1710 may be performed by a configuration manager as described with reference to FIGS. 9 through 12.

At 1715, the base station may initiate the handover procedure with the UE and a target base station for the UE to establish a second connection with the target base station. The operations of 1715 may be performed according to the methods described herein. In some examples, aspects of the operations of 1715 may be performed by a handover procedure manager as described with reference to FIGS. 9 through 12.

At 1720, the base station may receive a physical layer signal or a MAC layer signal from the UE indicating that the handover procedure was unsuccessful based on a failure of the UE to successfully receive and decode a control signal from the target base station during the monitoring period. The operations of 1720 may be performed according to the methods described herein. In some examples, aspects of the operations of 1720 may be performed by a handover failure manager as described with reference to FIGS. 9 through 12.

At 1725, the base station may determine that a resource release command was not transmitted to the UE from the target base station during the handover procedure, where the handover procedure being unsuccessful is based on the absence of the resource release command, the resource release command including the control signal. The operations of 1725 may be performed according to the methods described herein. In some examples, aspects of the operations of 1725 may be performed by a resource release manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: establishing a first connection with a source base station; determining that a handover procedure is being performed for establishing a second connection with a target base station; monitoring, during a monitoring period instantiated at a physical layer of a protocol stack of the UE, for a control signal acknowledging success of the handover procedure from a target base station; and transmitting, based at least in part on a result of the monitoring during the monitoring period, a physical layer signal or a medium access control layer signal to the source base station indicating that the handover procedure was unsuccessful based at least in part on a failure to successfully receive and decode the control signal.

Aspect 2: The method of aspect 1, further comprising: receiving a configuration signal from the source base station identifying a duration for the monitoring period initiated during the handover procedure.

Aspect 3: The method of aspect 2, further comprising: initiating the monitoring period at the physical layer based at least in part on the handover procedure, wherein the physical layer signal or the medium access control layer signal is transmitted based at least in part on expiration of the monitoring period without successfully receiving and decoding the control signal.

Aspect 4: The method of any of aspects 2 through 3, wherein the configuration signal comprises at least one of an RRC signal, or a MAC CE, or a DCI, or a combination thereof.

Aspect 5: The method of any of aspects 2 through 4, wherein the monitoring period is initiated based at least in part on at least one of receiving a handover command from the source base station, or transmitting an acknowledgement message in response to the handover command to the source base station, or transmitting a first RACH message to the target base station, or a combination thereof.

Aspect 6: The method of any of aspects 1 through 5, further comprising: identifying a duration for the monitoring period initiated during the handover procedure as a preconfigured duration.

Aspect 7: The method of any of aspects 1 through 6, further comprising: performing, during the handover procedure, a RACH procedure with the target base station, wherein the handover procedure being unsuccessful is based at least in part on a failure to successfully receive and decode a RACH message from the target base station during the RACH procedure, the RACH message comprising the control signal.

Aspect 8: The method of aspect 7, wherein the RACH message comprises at least one of a RACH msg2 of a four-step RACH procedure, or a RACH msg4 of the four-step RACH procedure, or a RACH msgB of a two-step RACH procedure, or a combination thereof.

Aspect 9: The method of any of aspects 1 through 8, further comprising: identifying, during the handover procedure, a failure to successfully receive and decode a resource release command from the target base station during the handover procedure, wherein the handover procedure being unsuccessful is based at least in part on the absence of the resource release command, the resource release command comprising the control signal.

Aspect 10: The method of aspect 9, wherein the resource release command comprises a connection reestablishment message received from the target base station.

Aspect 11: The method of any of aspects 1 through 10, further comprising: determining that an acknowledgement message was not received from the source base station acknowledging receipt of the physical layer signal or the medium access control signal; and determining, based at least in part on the absence of the acknowledgement message, that the first connection with the source base station has failed.

Aspect 12: The method of aspect 11, further comprising: initiating a connection reestablishment procedure to establish a new connection with the source base station, or the target base station, or a candidate target base station.

Aspect 13: The method of any of aspects 1 through 12, wherein the control signal comprises a handover success acknowledgement signal transmitted from the target base station at the physical layer.

Aspect 14: The method of any of aspects 1 through 13, wherein the physical layer signal or the medium access control layer signal comprises at least one of a PUCCH signal, or a MAC CE signal, or a combination thereof.

Aspect 15: The method of any of aspects 1 through 14, wherein the physical layer signal or the medium access control layer signal indicates a channel performance metric for at least one of the first connection with the source base station, the second connection with the target base station, a connection with a candidate target base station, or a combination thereof.

Aspect 16: The method of aspect 15, wherein the channel performance metric comprises at least one of a RSRP, or a RSRQ, or a SINR, or a combination thereof.

Aspect 17: A method for wireless communications at a source base station, comprising: establishing a first connection with a UE; transmitting a configuration signal to the UE identifying a duration of a monitoring period initiated at a physical layer of a protocol stack of the UE during a handover procedure; initiating the handover procedure with the UE and a target base station for the UE to establish a second connection with the target base station; and receiving a physical layer signal or a medium access control layer signal from the UE indicating that the handover procedure was unsuccessful based at least in part on a failure of the UE to successfully receive and decode a control signal from the target base station during the monitoring period.

Aspect 18: The method of aspect 17, further comprising: identifying the duration of the monitoring period initiated during the handover procedure as a preconfigured duration.

Aspect 19: The method of any of aspects 17 through 18, wherein the configuration signal comprises at least one of an RRC signal, or a MAC CE, or a DCI, or a combination thereof.

Aspect 20: The method of any of aspects 17 through 19, further comprising: determining that a resource release command was not transmitted to the UE from the target base station during the handover procedure, wherein the handover procedure being unsuccessful is based at least in part on the absence of the resource release command, the resource release command comprising the control signal.

Aspect 21: The method of aspect 20, wherein the resource release command comprises a connection reestablishment message.

Aspect 22: The method of any of aspects 17 through 21, further comprising: transmitting an acknowledgment message to the UE acknowledging receipt of the physical layer signal or the medium access control signal; and continuing to perform wireless communications with the UE over the first connection.

Aspect 23: The method of any of aspects 17 through 22, further comprising: transmitting an acknowledgment message to the UE acknowledging receipt of the physical layer signal or the medium access control signal; identifying a new target base station for the UE based at least in part on the physical layer signal or the medium access control signal; and initiating a second handover procedure with the UE and the new target base station for the UE to establish a third connection with the new target base station.

Aspect 24: The method of any of aspects 17 through 23, wherein the physical layer signal or the medium access control layer signal comprises at least one of a PUCCH layer signal, or a MAC CE signal, or a combination thereof.

Aspect 25: The method of any of aspects 17 through 24, wherein the physical layer signal or the medium access control layer signal indicates a channel performance metric for at least one of the first connection with the source base station, the second connection with the target base station, a connection with a candidate target base station, or a combination thereof.

Aspect 26: The method of aspect 25, wherein the channel performance metric comprises at least one of a RSRP, or a RSRQ, or a SINR, or a combination thereof.

Aspect 27: An apparatus for wireless communication at a UE, comprising a processor; memory coupled with the processor; and instructions stored in the memory and executable by the processor to cause the apparatus to perform a method of any of aspects 1 through 16.

Aspect 28: An apparatus for wireless communication at a UE, comprising at least one means for performing a method of any of aspects 1 through 16.

Aspect 29: A non-transitory computer-readable medium storing code for wireless communication at a UE, the code comprising instructions executable by a processor to perform a method of any of aspects 1 through 16.

Aspect 30: An apparatus for wireless communications at a source base station, comprising a processor; memory coupled with the processor; and instructions stored in the memory and executable by the processor to cause the apparatus to perform a method of any of aspects 17 through 26.

Aspect 31: An apparatus for wireless communications at a source base station, comprising at least one means for performing a method of any of aspects 17 through 26.

Aspect 32: A non-transitory computer-readable medium storing code for wireless communications at a source base station, the code comprising instructions executable by a processor to perform a method of any of aspects 17 through 26.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    establishing a first connection with a source base station;
    determining that a handover procedure is being performed for establishing a second connection with a target base station;
    monitoring, during a monitoring period instantiated at a physical layer of a protocol stack of the UE, for a control signal acknowledging success of the handover procedure from a target base station; and
    transmitting, based at least in part on a result of the monitoring during the monitoring period, a physical layer signal or a medium access control layer signal to the source base station indicating that the handover procedure was unsuccessful based at least in part on a failure to successfully receive and decode the control signal.

2. The method of claim 1, further comprising:
receiving a configuration signal from the source base station identifying a duration for the monitoring period initiated during the handover procedure.

3. The method of claim 2, further comprising:
initiating the monitoring period at the physical layer based at least in part on the handover procedure, wherein the physical layer signal or the medium access control layer signal is transmitted based at least in part on expiration of the monitoring period without successfully receiving and decoding the control signal.

4. The method of claim 2, wherein the configuration signal comprises at least one of a radio resource control (RRC) signal, or a medium access control (MAC) control element (CE), or a downlink control information (DCI), or a combination thereof.

5. The method of claim 2, wherein the monitoring period is initiated based at least in part on at least one of receiving a handover command from the source base station, or transmitting an acknowledgement message in response to the handover command to the source base station, or transmitting a first random access channel (RACH) message to the target base station, or a combination thereof.

6. The method of claim 1, further comprising:
identifying a duration for the monitoring period initiated during the handover procedure as a preconfigured duration.

7. The method of claim 1, further comprising:
performing, during the handover procedure, a random access channel (RACH) procedure with the target base station, wherein the handover procedure being unsuccessful is based at least in part on a failure to successfully receive and decode a RACH message from the target base station during the RACH procedure, the RACH message comprising the control signal.

8. The method of claim 7, wherein the RACH message comprises at least one of a RACH message two (msg2) of a four-step RACH procedure, or a RACH message four (msg4) of the four-step RACH procedure, or a RACH message B (msgB) of a two-step RACH procedure, or a combination thereof.

9. The method of claim 1, further comprising:
identifying, during the handover procedure, a failure to successfully receive and decode a resource release command from the target base station during the handover procedure, wherein the handover procedure being unsuccessful is based at least in part on the absence of the resource release command, the resource release command comprising the control signal.

10. The method of claim 9, wherein the resource release command comprises a connection reestablishment message received from the target base station.

11. The method of claim 1, further comprising:
determining that an acknowledgement message was not received from the source base station acknowledging receipt of the physical layer signal or the medium access control signal; and
determining, based at least in part on the absence of the acknowledgement message, that the first connection with the source base station has failed.

12. The method of claim 11, further comprising:
initiating a connection reestablishment procedure to establish a new connection with the source base station, or the target base station, or a candidate target base station.

13. The method of claim 1, wherein the control signal comprises a handover success acknowledgement signal transmitted from the target base station at the physical layer.

14. The method of claim 1, wherein the physical layer signal or the medium access control layer signal comprises at least one of a physical uplink control channel (PUCCH) signal, or a medium access control (MAC) control element (CE) signal, or a combination thereof.

15. The method of claim 1, wherein the physical layer signal or the medium access control layer signal indicates a channel performance metric for at least one of the first connection with the source base station, the second connection with the target base station, a connection with a candidate target base station, or a combination thereof.

16. The method of claim 15, wherein the channel performance metric comprises at least one of a reference signal received power (RSRP), or a reference signal received quality (RSRQ), or a signal-to-noise-to-interference ratio (SINR), or a combination thereof.

17. A method for wireless communications at a source base station, comprising:
establishing a first connection with a user equipment (UE);
transmitting a configuration signal to the UE identifying a duration of a monitoring period initiated at a physical layer of a protocol stack of the UE during a handover procedure;
initiating the handover procedure with the UE and a target base station for the UE to establish a second connection with the target base station; and
receiving a physical layer signal or a medium access control layer signal from the UE indicating that the handover procedure was unsuccessful based at least in part on a failure of the UE to successfully receive and decode a control signal from the target base station during the monitoring period.

18. The method of claim 17, further comprising:
identifying the duration of the monitoring period initiated during the handover procedure as a preconfigured duration.

19. The method of claim 17, wherein the configuration signal comprises at least one of a radio resource control (RRC) signal, or a medium access control (MAC) control element (CE), or a downlink control information (DCI), or a combination thereof.

20. The method of claim 17, further comprising:
determining that a resource release command was not transmitted to the UE from the target base station during the handover procedure, wherein the handover procedure being unsuccessful is based at least in part on the absence of the resource release command, the resource release command comprising the control signal.

21. The method of claim 20, wherein the resource release command comprises a connection reestablishment message.

22. The method of claim 17, further comprising:
transmitting an acknowledgment message to the UE acknowledging receipt of the physical layer signal or the medium access control signal; and
continuing to perform wireless communications with the UE over the first connection.

23. The method of claim 17, further comprising:
transmitting an acknowledgment message to the UE acknowledging receipt of the physical layer signal or the medium access control signal;
identifying a new target base station for the UE based at least in part on the physical layer signal or the medium access control signal; and
initiating a second handover procedure with the UE and the new target base station for the UE to establish a third connection with the new target base station.

24. The method of claim 17, wherein the physical layer signal or the medium access control layer signal comprises at least one of a physical uplink control channel (PUCCH) layer signal, or a medium access control (MAC) control element (CE) signal, or a combination thereof.

25. The method of claim 17, wherein the physical layer signal or the medium access control layer signal indicates a channel performance metric for at least one of the first connection with the source base station, the second connection with the target base station, a connection with a candidate target base station, or a combination thereof.

26. The method of claim 25, wherein the channel performance metric comprises at least one of a reference signal received power (RSRP), or a reference signal received quality (RSRQ), or a signal-to-noise-to-interference ratio (SINR), or a combination thereof.

27. An apparatus for wireless communication at a user equipment (UE), comprising:
a processor,
memory coupled with the processor; and
instructions stored in the memory and executable by the processor to cause the apparatus to:
establish a first connection with a source base station;
determine that a handover procedure is being performed for establishing a second connection with a target base station;
monitor, during a monitoring period instantiated at a physical layer of a protocol stack of the UE, for a control signal acknowledging success of the handover procedure from a target base station; and
transmit, based at least in part on a result of the monitoring during the monitoring period, a physical layer signal or a medium access control layer signal to the source base station indicating that the handover procedure was unsuccessful based at least in part on a failure to successfully receive and decode the control signal.

28. The apparatus of claim 27, wherein the instructions are further executable by the processor to cause the apparatus to:
receive a configuration signal from the source base station identifying a duration for the monitoring period initiated during the handover procedure.

29. The apparatus of claim 28, wherein the instructions are further executable by the processor to cause the apparatus to:
initiate the monitoring period at the physical layer based at least in part on the handover procedure, wherein the physical layer signal or the medium access control layer signal is transmitted based at least in part on expiration of the monitoring period without successfully receiving and decoding the control signal.

30. An apparatus for wireless communications at a source base station, comprising:
a processor,
memory coupled with the processor; and
instructions stored in the memory and executable by the processor to cause the apparatus to:
establish a first connection with a user equipment (UE);
transmit a configuration signal to the UE identifying a duration of a monitoring period initiated at a physical layer of a protocol stack of the UE during a handover procedure;
initiate the handover procedure with the UE and a target base station for the UE to establish a second connection with the target base station; and
receive a physical layer signal or a medium access control layer signal from the UE indicating that the handover procedure was unsuccessful based at least in part on a failure of the UE to successfully receive and decode a control signal from the target base station during the monitoring period.

* * * * *